US012725453B1

(12) United States Patent
Groom

(10) Patent No.: US 12,725,453 B1
(45) Date of Patent: Sep. 1, 2026

(54) MULTI-DOMAIN GROUND-TRUTH DATA STRUCTURIZATION WITH AUTOMATED CONTEXTUAL ENRICHMENT AND VALUATION

(71) Applicant: GROOM VENTURES LLC, Manassas, VA (US)

(72) Inventor: John F. Groom, Manassas, VA (US)

(73) Assignee: GROOM VENTURES LLC, Manassas, VA (US)

( * ) Notice: Subject to any disclaimer, the term of this patent is extended or adjusted under 35 U.S.C. 154(b) by 0 days.

(21) Appl. No.: 19/397,115

(22) Filed: Nov. 21, 2025

(51) Int. Cl.
*G06V 40/20* (2022.01)
*G06T 7/00* (2017.01)
(Continued)

(52) U.S. Cl.
CPC ............ *G06V 40/23* (2022.01); *G06T 7/0002* (2013.01); *G06T 7/246* (2017.01); *G06T 7/73* (2017.01);
(Continued)

(58) Field of Classification Search
CPC .... G06V 40/23; G06V 10/761; G06V 10/764; G06T 7/246; G06T 7/73; G06T 7/0002;
(Continued)

(56) References Cited

U.S. PATENT DOCUMENTS 8,468,244 B2 6/2013 Redlich
8,533,851 B2 9/2013 Ginter
(Continued)

FOREIGN PATENT DOCUMENTS

IN 202241011815 A 9/2023
IN 202321049598 A 8/2024
(Continued)

OTHER PUBLICATIONS

Ahmadpour, et al. "Analysis and Prediction of Movement Patterns Based on Artificial Intelligence with a Health Behavior Perspective: Analysis and prediction of movement patterns", Int J Body Mind Cult, vol. 11, No. 5, pp. 489-513, Oct. 2024.
(Continued)

*Primary Examiner* — Apu M Mofiz
*Assistant Examiner* — Husam Turki Samara
(74) *Attorney, Agent, or Firm* — Definitive Patents, member Synchrony IP; Timothy D. Snowden; Yau H. Chan

(57) ABSTRACT

Apparatus and related methods may relate to transforming heterogeneous real-world data into standardized data assets, such as for ingestion by AI models. In an illustrative example, a method may include generating, for standardized data assets, a dataset-quality score. The method may, for example, include storing each standardized data asset together with its dataset-quality score in a distributed database. The method may, for example, include performing automated data completeness verification on standardized data assets stored in the distributed database. The method may include, for example, generating a privacy-preserving training view in response to a request received from an external artificial-intelligence system. The privacy-preserving training view may, for example, include from the first data structure only data that satisfies the stored output generation rules. The second data structure may, for example, be retained in the distributed database. An auditable compliance chain associated with the unique identifier may, for example, be preserved.

25 Claims, 17 Drawing Sheets

(51) Int. Cl.
*G06T 7/246* (2017.01)
*G06T 7/73* (2017.01)
*G06V 10/74* (2022.01)
*G06V 10/764* (2022.01)

(52) U.S. Cl.
CPC .......... *G06V 10/761* (2022.01); *G06V 10/764* (2022.01); *G06T 2207/10016* (2013.01); *G06T 2207/20081* (2013.01); *G06T 2207/30168* (2013.01); *G06T 2207/30196* (2013.01); *G06T 2207/30241* (2013.01)

(58) Field of Classification Search
CPC . G06T 2207/10016; G06T 2207/20081; G06T 2207/30168; G06T 2207/30196; G06T 2207/30241
See application file for complete search history.

(56) References Cited

U.S. PATENT DOCUMENTS

| | | | | |
|---|---|---|---|---|
| 8,676,800 | B2 | 3/2014 | Peters | |
| 8,676,937 | B2 | 3/2014 | Rapaport | |
| 8,719,304 | B2 | 5/2014 | Golze | |
| 8,738,562 | B2 | 5/2014 | Oaten | |
| 8,755,837 | B2 | 6/2014 | Rhoads | |
| 9,849,364 | B2 | 12/2017 | Tran | |
| 10,078,694 | B2 | 9/2018 | Maharajh | |
| 10,740,719 | B2 | 8/2020 | Kaweske | |
| 10,764,254 | B2 | 9/2020 | Ford | |
| 11,086,311 | B2 | 8/2021 | Cella | |
| 11,100,448 | B1 | 8/2021 | Plazola | |
| 11,151,653 | B1 | 10/2021 | Donia | |
| 11,189,368 | B2 | 11/2021 | Heath | |
| 11,216,410 | B2 | 1/2022 | Dirienzo | |
| 11,461,577 | B2 | 10/2022 | Van Oldenborgh | |
| 11,528,341 | B2 | 12/2022 | Ogrinz | |
| 11,628,351 | B2 | 4/2023 | Tran | |
| 11,699,019 | B2 | 7/2023 | Souche | |
| 11,735,026 | B1 | 8/2023 | Krayer | |
| 11,762,875 | B2 | 9/2023 | Nordell-Markovits | |
| 11,977,530 | B2 | 5/2024 | Soon-Shiong | |
| 11,983,157 | B2 | 5/2024 | Soon-Shiong | |
| 12,169,470 | B2 | 12/2024 | Dirienzo | |
| 12,322,508 | B2 | 6/2025 | Molero Leon | |
| 12,352,889 | B2 | 7/2025 | Zhu | |
| 12,367,337 | B2 | 7/2025 | Gutierrez | |
| 12,394,506 | B2 | 8/2025 | Wilkinson | |
| 2017/0053131 | A1 | 2/2017 | Modi | |
| 2019/0180291 | A1 | 6/2019 | Schmeling | |
| 2020/0368616 | A1 | 11/2020 | Delamont | |
| 2021/0008413 | A1 | 1/2021 | Asikainen | |
| 2021/0117071 | A1 | 4/2021 | Gharpuray | |
| 2021/0209127 | A1 | 7/2021 | McGregor | |
| 2021/0352134 | A1 | 11/2021 | Bjontegard | |
| 2021/0406278 | A1 | 12/2021 | Ossher | |
| 2022/0203168 | A1 | 6/2022 | Calderon | |
| 2022/0226695 | A1 | 7/2022 | Madonna | |
| 2022/0262010 | A1 | 8/2022 | Shpuza | |
| 2022/0296966 | A1 | 9/2022 | Asikainen | |
| 2022/0342915 | A1 | 10/2022 | Visscher | |
| 2023/0073876 | A1 | 3/2023 | Child | |
| 2023/0285806 | A1* | 9/2023 | Webster | G06T 7/20 |
| 2023/0307103 | A1 | 9/2023 | Wilkinson | |
| 2024/0004892 | A1 | 1/2024 | Visscher | |
| 2024/0181295 | A1 | 6/2024 | Kashyap | |
| 2024/0205023 | A1 | 6/2024 | Tarkhanyan | |
| 2024/0331066 | A1 | 10/2024 | Wang | |
| 2024/0382806 | A1 | 11/2024 | Omid-Zohoor | |
| 2024/0386015 | A1 | 11/2024 | Crabtree | |
| 2025/0001260 | A1 | 1/2025 | Benjamin | |
| 2025/0022317 | A1 | 1/2025 | Kitamura | |
| 2025/0117493 | A1 | 4/2025 | Thompson | |
| 2025/0201144 | A1* | 6/2025 | McCann | G06Q 50/205 |
| 2025/0315507 | A1 | 10/2025 | Bjontegard | |
| 2026/0031190 | A1* | 1/2026 | Li | G06F 16/1744 |

FOREIGN PATENT DOCUMENTS

| | | | |
|---|---|---|---|
| IN | 202441057191 | A | 8/2024 |
| WO | 2024127412 | A1 | 6/2024 |

OTHER PUBLICATIONS

Bengtson. "A Guide to Getting Ai-Ready Part 1: Building a Modern Ai stack." Striim. Retrieved on Nov. 6, 2025 from https://www.striim.com/blog/guide-to-getting-ai-ready-part-1-building-a-modern-ai-stack/ (pp. 1-10).

CASA. "casatasks—CASAdocs documentation." Retrieved Nov. 6, 2025 from https://casadocs.readthedocs.io/en/stable/api/casatasks.html (pp. 1-9).

Egnyte. Metadata Tagging. Oct. 3, 2021. Retrieved from https://www.egnyte.com/guides/life-sciences/metadata-tagging (pp. 1-7).

GS1. "GS1 Global Traceability Standard" Aug. 2017. Retrieved from https://www.gs1.org/standards/gs1-global-traceability-standard/current-standard (pp. 1-47).

InspectorIO.com. "The Three Levels of Traceability: What You Need to Know." Jul. 28, 2023. Retrieved from https://inspectorio.com/blog/three-levels-of-traceability (pp. 1-4).

Tang, et al. "From brain to movement: Wearables-based motion intention prediction across the human nervous system." Nano Energy, vol. 115, 2023, 108712, ISSN 2211-2855, https://doi.org/10.1016/j.nanoen.2023.108712.

Titiya. "Part 3 -Building Your AI-Ready Data Stack: Data ingestion design pattern." Medium. Jun. 14, 2024. Retrieved from https://medium.com/@gunjantitiya/part-3-building-your-ai-ready-data-stack-data-ingestion-design-pattern-976ce273154a (pp. 1-7).

Winks. "How AI-Ready Data Lineage Activates Trust & Context in 2025" Atlan.com. Aug. 22, 2025. Retrieved from https://atlan.com/know/ai-readiness/ai-ready-data-lineage/ (pp. 1-12).

* cited by examiner

805

```
{
 "video_asset": {
  "video_id": "vid_55ca",
  "person_id": "prs_9f2a",
  "capture_device": {
   "device_id": "ios_cam_14",
   "make": "Apple",
   "model": "iPhone 14",
   "firmware": "17.1.2"
  },
  "capture_profile": {
   "fps": 30,
   "resolution": "1920x1080",
   "codec": "H264",
   "audio": true
  },
  "timestamps": {
   "start": "2025-11-10T09:00:00Z",
   "end": "2025-11-10T09:22:48Z",
   "elapsed_s": 1368.0
  },
  "metadata_chain": [
   { "t": "2025-11-10T09:00:00Z", "hash": "sha256:...", "prev": null },
   { "t": "2025-11-10T09:00:01Z", "hash": "sha256:...", "prev": "sha256:..." }
  ],
  "geo": { "lat": 51.5074, "lon": -0.1278, "region": "EU" },
  "quality_indicators": {
   "frame_continuity_score": 0.99,
   "resolution_ok": true,
   "timestamp_monotonic": true
  },
  "consent_ids": ["cns_41ab"],
  "tags": ["tag:everything:vid_55ca"],
  "version": "v1"
 }
}
```

FIG. 8A

```
{
 "session_validation": {
  "validation_id": "val_bmk_2201",
  "video_id": "vid_55ca",
  "checks": {
   "cryptographic_consistency": {
    "method": "hash_chain_sha256",
    "result": "pass",
    "breaks_detected": 0
   },
   "frame_continuity": {
    "method": "frame_index_and_pts_scan",
    "sequence_breaks": 0,
    "visual_edit_artifacts": 0
   },
   "timestamp_integrity": {
    "monotonic": true,
    "drift_ms": 4
   }
  },
  "benchmark_routine": {
   "regimen_id": "bmk_core_v5",
   "requirements": {
    "single_session": true,
    "min_duration_s": 300,
    "required_exercises": ["squat_bodyweight", "pushup_modified"]
   }
  },
  "validated_continuous_stream": true,
  "elapsed_s": 1368.0,
  "audit": { "no_human_input": true, "generated_at": "2025-11-10T09:22:49Z" },
  "version": "v1"
 }
}
```

```
{
 "pose_trace": {
  "data_id": "dat_7821",
  "video_id": "vid_55ca",
  "person_id": "prs_9f2a",
  "model": { "skeleton": "BlazePose_33", "sampling_hz": 30 },
  "frames": [
   {
    "t": 0.00,
    "landmarks": {
     "Nose": [0.51, 0.12, 1.72],
     "LShoulder": [0.12, 0.88, 1.70],
     "RElbow": [0.31, 0.74, 1.60]
    }
   }
  ],
  "biomech": {
   "angles_deg": {
    "elbow_flexion": [45.2, 46.1],
    "shoulder_abduction": [12.4, 13.0]
   },
   "trajectories": {
    "wrist_left_path_len": 1.24,
    "hip_vertical_disp": 0.18
   },
   "velocity": {
    "wrist_left_peak_mps": 1.05,
    "torso_avg_mps": 0.12
   },
   "rom": {
    "elbow_flexion_range": 45.9,
    "hip_extension_range": 22.5
   }
  },
  "consent_ids": ["cns_41ab"],
  "tags": ["tag:everything:dat_7821"],
  "version": "v1"
 }
}
```

```
{
 "classification_entry": {
  "entry_id": "cls_def_bench_press_modified_45deg_v2_1",
  "exercise_type_id": "bench_press_modified_45deg",
  "functional_category": "upper_push",
  "predefined_biomech_criteria": {
   "angles_required": {
    "elbow_flexion_deg": { "min": 40, "max": 55 },
    "shoulder_abduction_deg": { "min": 8, "max": 20 }
   },
   "velocity_windows": {
    "tempo_controlled_mps": { "min": 0.05, "max": 0.6 }
   },
   "positional_constraints": {
    "scapular_stability_index": { "min": 0.7 }
   }
  },
  "modification_indicators": ["reduced_range_safety", "shoulder_protective"],
  "rule_sets": ["angle_thresholds:v2.1", "tempo_rules:v1"],
  "version": "v2.1"
 },
 "classification_result": {
  "classification_id": "cls_102a",
  "input_data_id": "dat_7821",
  "person_id": "prs_9f2a",
  "best_match_entry_id": "cls_def_bench_press_modified_45deg_v2_1",
  "confidence": 0.93,
  "standard_or_modified": "modified",
  "reason_code": "shoulder_protective",
  "similarity_scores": [
   { "entry_id": "cls_def_bench_press_standard_v2_1", "score": 0.72 },
   { "entry_id": "cls_def_bench_press_modified_45deg_v2_1", "score": 0.93 }
  ],
  "user_label_override": {
   "provided": "bench_press",
   "reclassified_to": "bench_press_modified_45deg"
  },
  "version": "v1"
 }
}
```

FIG. 8D

```
{
 "performance_record": {
  "record_id": "rec_9b21",
  "person_id": "prs_9f2a",
  "video_id": "vid_55ca",
  "validation_id": "val_bmk_2201",
  "data_id": "dat_7821",
  "exercise_type_id": "bench_press_modified_45deg",
  "benchmark_regimen_id": "bmk_core_v5",
  "elapsed_s": 1368.0,
  "validated_continuous_stream": true,
  "biomech_summary": {
   "rom_keys": ["elbow_flexion_range", "hip_extension_range"],
   "velocity_keys": ["wrist_left_peak_mps", "torso_avg_mps"],
   "positional_keys": ["scapular_stability_index"]
  },
  "quality_flags": {
   "frame_continuity_ok": true,
   "timestamp_auth_ok": true,
   "resolution_ok": true
  },
  "geo": { "lat": 51.5074, "lon": -0.1278, "region": "EU" },
  "consent_ids": ["cns_41ab"],
  "tags": ["tag:everything:rec_9b21"],
  "created_at": "2025-11-10T09:22:50Z",
  "version": "v1"
 }
}
```

FIG. 8E

```
{
  "benchmark_regimen": {
    "regimen_id": "bmk_core_v5",
    "title": "Core and Upper Push Benchmark V5",
    "requirements": {
      "single_session": true,
      "min_duration_s": 300,
      "required_exercises": [
        "squat_bodyweight",
        "pushup_modified"
      ]
    },
    "validation_policy": {
      "require_frame_continuity": true,
      "require_hash_chain": true
    },
    "bonus_rules": [
      { "type": "benchmark_completed", "value": 25 }
    ],
    "version": "v5"
  }
}
```

```
{
 "scoring_profile": {
  "profile_id": "gmip_v3",
  "functional_categories": [
   "upper_push",
   "upper_pull",
   "core_stability",
   "lower_squat",
   "lower_hinge"
  ],
  "weights": {
   "upper_push": 1.0,
   "upper_pull": 1.0,
   "core_stability": 1.2,
   "lower_squat": 1.1,
   "lower_hinge": 1.1
  },
  "normalization_method": "zscore+weights_v3",
  "percentile_recompute_policy": {
   "on_ingest": true,
   "min_new_records": 100
  },
  "quality_filters": {
   "min_frame_continuity": 0.95,
   "require_timestamp_auth": true
  },
  "version": "v3"
 },
 "normalized_score": {
  "score_id": "scr_77aa",
  "record_id": "rec_9b21",
  "person_id": "prs_9f2a",
  "exercise_type_id": "bench_press_modified_45deg",
  "functional_category": "upper_push",
  "reference_scope": "regional",
  "reference_dataset_id": "ref_eu_q4_2025",
  "ranking": 152,
  "population": 4821,
  "percentile": 0.968,
  "normalized_value": 712,
  "method": "zscore+weights_v3",
  "version": "v1"
 },
 "composite_fitness": {
  "composite_id": "cmp_55a1",
  "person_id": "prs_9f2a",
  "profile_id": "gmip_v3",
  "components": [
   { "bucket": "upper_push", "best_record_id": "rec_9b21", "score": 712 },
   { "bucket": "lower_squat", "best_record_id": "rec_9c02", "score": 735 },
   { "bucket": "core_stability", "best_record_id": "rec_9d88", "score": 780 }
  ],
  "bonuses": [{ "type": "benchmark_completed", "value": 25 }],
  "total": 2247,
  "scope": "global",
  "version": "v1"
 }
}
```

```
{
  public_attribute_profile": {
    "public_id": "pub_aa12",
    "record_id": "rec_9b21",
    "demographics": { "age": 34, "region": "EU" },
    "geographic_context": { "country": "UK", "city": "London" },
    "data_quality": {
      "frame_continuity_score": 0.99,
      "resolution": "1920x1080"
    },
    "immutable_hash": "sha256:public:...",
    "created_at": "2025-11-10T09:22:55Z",
    "version": "v1"
  },
  "private_attribute_profile": {
    "private_id": "priv_bb31",
    "record_id": "rec_9b21",
    "ownership_lineage": {
      "owner_person_id": "prs_9f2a",
      "creator_app": "GMIP-Mobile",
      "provenance": { "source": "app_upload", "verifier": "sig_srv_01" }
    },
    "consent_terms": ["cns_41ab"],
    "access_permissions": [
      { "role": "analytics_service", "scope": "aggregates_only" },
      { "role": "marketplace_buyer", "scope": "anonymized_training" }
    ],
    "immutable_hash": "sha256:private:...",
    "created_at": "2025-11-10T09:22:55Z",
    "version": "v1"
  },
  "linkage_identifier": {
    "uid": "lnk_ef77",
    "binds": {
      "record_id": "rec_9b21",
      "public_id": "pub_aa12",
      "private_id": "priv_bb31"
    },
    "everything_tags": [
      "tag:everything:rec_9b21",
      "tag:everything:pub_aa12",
      "tag:everything:priv_bb31"
    ],
    "revocation_policy": "cascade_on_consent_expiry",
    "version": "v1"
  }
}
```

```
{
 "consent_profile": {
  "consent_id": "cns_41ab",
  "subject_person_id": "prs_9f2a",
  "scope": ["pose_vectors", "video_frames:redacted"],
  "purposes": ["model_training", "quality_benchmarking"],
  "regions_allowed": ["EU", "US"],
  "expires_at": "2027-12-31T23:59:59Z",
  "provenance": { "source": "app_upload", "timestamp": "2025-10-12T15:04:05Z", "verifier": "sig_srv_01" },
  "immutable_hash": "sha256:consent:...",
  "version": "v1"
 }
}
```

```
{
 "marketplace_object": {
  "mo_id": "mkt_3301",
  "linkage_uid": "lnk_ef77",
  "export_policy": {
   "identity": "anonymized",
   "allowed_fields": [
    "functional_category",
    "normalized_value",
    "biomech_summary",
    "data_quality",
    "region"
   ],
   "blocked_fields": ["person_id", "geo.lat", "geo.lon", "ownership_lineage"]
  },
  "dataset_descriptor": {
   "title": "GMIP Regional Upper Push Benchmarks",
   "size_records": 100000,
   "skeleton": "BlazePose_33",
   "profile": "gmip_v3"
  },
  "compliance": {
   "consent_verified": true,
   "policy_ref": "privacy_rule_eu2025_v2"
  },
  "version": "v1"
 }
}
```

FIG. 8J

MULTI-DOMAIN GROUND-TRUTH DATA STRUCTURIZATION WITH AUTOMATED CONTEXTUAL ENRICHMENT AND VALUATION

CROSS-REFERENCE TO RELATED APPLICATIONS

This application may share inventor(s) and/or subject matter with one or more of the following applications:

- U.S. patent application Ser. No. 14/281,010, filed May 19, 2014 (naming inventor(s) including GROOM, John) and titled "Alternative search methodology";
- U.S. patent application Ser. No. 14/302,401, filed Jun. 11, 2014 (naming inventor(s) including GROOM, John) and titled "Alternative search methodology";
- WO patent application serial no. PCT/US2014/042035, filed Jun. 12, 2014 (naming inventor(s) including GROOM, John) and titled "Alternative search methodology";
- U.S. patent application Ser. No. 15/912,199, filed Mar. 5, 2018 (naming inventor(s) including GROOM, John) and titled "Alternative search methodology";
- U.S. patent application Ser. No. 17/173,911, filed Feb. 11, 2021 (naming inventor(s) including GROOM, John) and titled "Alternative search methodology";
- U.S. patent application Ser. No. 16/947,455, filed Aug. 3, 2020 (naming inventor(s) including GROOM, John) and titled "Multi-dimensional interaction with data stores related to tangible property";
- U.S. patent application Ser. No. 19/045,488, filed Feb. 4, 2025 (naming inventor(s) including GROOM, John) and titled "Multi-dimensional interaction with data stores related to tangible property";
- U.S. patent application Ser. No. 17/819,590, filed Aug. 12, 2022 (naming inventor(s) including GROOM, John) and titled "Multi-dimensional interaction with data stores related to tangible property";
- U.S. patent application Ser. No. 17/819,599, filed Aug. 12, 2022 (naming inventor(s) including GROOM, John) and titled "Digital tags to facilitate production, collaboration, transparency, privacy, authentication, history, synchronization, ownership, and regulatory compliance during the creation and use of a product"; and
- U.S. patent application Ser. No. 18/345,655, filed Jun. 30, 2023 (naming inventor(s) including GROOM, John) and titled "Digital tags to facilitate production, collaboration, transparency, privacy, authentication, history, synchronization, ownership, and regulatory compliance during the creation and use of a product".

The entire contents of each of the foregoing applications and their priority applications, if any, are incorporated herein by reference.

Unless expressly stated, changes in terminology from prior application(s) to this application are made without prejudice or disclaimer of subject matter. Changes from the prior application(s) are intended to be broadening and/or additive unless expressly stated otherwise. Replacement of alternative terms with a single representative term, for example, are inclusive unless otherwise defined. Various embodiments may also be found in previous disclosure(s) incorporated by reference. Embodiments of similar languages in this application are not modifications or disclaimer of the embodiments disclosed in previous incorporated disclosures unless otherwise stated.

TECHNICAL FIELD

Various embodiments relate generally to automatically generating, structuring, enriching, maintaining, and/or providing structured datasets, such as, for example, for performance analytics, benchmarking, and/or machine-learning applications.

BACKGROUND

People may evaluate fitness in many different ways depending on context, goals, and/or available resources. Some approaches may focus on cardiovascular capacity, such as how long a person can sustain a certain pace, how quickly heart rate recovers, and/or how much distance is covered within a time window. Other approaches may emphasize muscular strength, endurance, flexibility, balance, and/or body composition indicators like body mass index or circumference measurements. In some environments, these perspectives may be combined into broader views of overall physical readiness, functional capability, and/or perceived wellness.

Fitness evaluation can be used in a variety of settings. For example, individuals engaged in recreational training and/or competitive sports may track performance metrics to monitor progress, prepare for events, and/or compare performance across training cycles. Health-care and/or rehabilitation environments may consider fitness measurements when designing exercise prescriptions, monitoring adherence, and/or assessing responses to treatment. Employers, schools, and/or community programs may incorporate fitness assessments into wellness initiatives, participation requirements, and/or risk management strategies. Some people may also use fitness data to adjust daily routines, such as modifying activity levels, rest patterns, and/or nutritional habits.

To support these activities, different methods and/or systems may be utilized by coaches, clinicians, and/or individual users. Some approaches may rely on structured fitness tests, for example timed runs, step tests, repetition-based strength tests, flexibility assessments, and/or balance challenges. Other approaches may use wearable devices, smart watches, and/or mobile applications that estimate metrics such as heart rate, step count, energy expenditure, training load, and/or sleep quality. In certain environments, laboratory tests, cardiopulmonary exercise assessments, and/or imaging-based measurements may be employed to obtain more detailed physiological information. Results from these various sources may be recorded on paper, in spreadsheets, and/or in online platforms.

Apparatus and related methods may relate to transforming heterogeneous real-world data into standardized data assets, such as for ingestion by AI models. In an illustrative example, a method may include generating, for standardized data assets, a dataset-quality score. The method may, for example, include storing each standardized data asset together with its dataset-quality score in a distributed database. The method may, for example, include performing automated data completeness verification on standardized data assets stored in the distributed database. The method may include, for example, generating a privacy-preserving training view in response to a request received from an external artificial-intelligence system. The privacy- preserving training view may, for example, include from the first data structure only data that satisfies the stored output generation rules. The second data structure may, for example, be retained in the distributed database. An auditable compliance chain associated with the unique identifier may, for example, be preserved.

SUMMARY

Apparatus and related methods relate to classifying performance based on actual movement of a user. In an illustrative embodiment, a tamper-proof benchmark performance evaluation system (TBPES) may be configured to receive video data depicting a user performing a benchmark exercise routine. For example, the TBPES may apply a pose estimation model to detect body landmarks across video frames. For example, the TBPES may determine biomechanical characteristics based on the body landmarks. For example, the TBPES may classify exercise types based on the biomechanical characteristics rather than user-provided labels. For example, the TBPES may validate that the benchmark routine is completed in a single unedited continuous recording. For example, the TBPES may generate a structured performance record for the completed benchmark routine. Various embodiments may advantageously prevent fitness analytics accuracy being degraded by edited video data and/or inconsistent exercise labels.

Apparatus and related methods relate to generating geo-aware comparison scores for exercise performance across activities. In an illustrative embodiment, a cross-exercise geo-normalized scoring system (CEGNSS) may receive exercise performance records with exercise identifiers, metrics, user identifiers, locations, and timestamps. For example, the CEGNSS may receive a comparison scope selection indicating local, regional, and/or global context. For example, the CEGNSS may construct a reference dataset based on the comparison scope from a distributed performance record data store. For example, the CEGNSS may map exercise-specific metrics from the reference cohort onto a normalized performance index. For example, the CEGNSS may determine percentile positions and/or rank order of a target performance within the normalized index. For example, the CEGNSS may automatically update the distributed performance record data store when additional performance records rare received. Various embodiments may advantageously automatically refresh the rankings and normalized scores so that cross-exercise, cross-region comparisons remain current without human intervention.

Apparatus and related methods relate to automatic classification of physical exercises based on biomechanical signatures extracted from human-movement video data. In an illustrative embodiment a bio-signature based exercise classification system (BSBECS) may receive video data representing a physical-exercise performance. For example, the BSBECS may apply a pose estimation engine to the video data to generate a temporal body-landmark sequence from the video frames. For example, the temporal body-landmark sequence may provide position coordinates for anatomical landmarks across a time-ordered series of frames. For example, a biomechanical signature generation engine may use the temporal body-landmark sequence to compute joint-angle values, ranges of motion, and movement velocities. For example, an automatic classification engine may compare the biomechanical signature to predefined biomechanical criteria stored in an exercise classification database without relying on user-provided labels. For example, the automatic classification engine may select a close-matching exercise identifier and an associated modification indicator for the physical-exercise performance. Various embodiments may advantageously reduce human errors in exercise classification.

Various embodiments may achieve one or more advantages. For example, some embodiments may advantageously reduce a risk of undetected retroactive modification of historical performance records. For example, some embodiments may advantageously reduce a risk of resource exhaustion when servicing high-volume access to movement or performance data. Some embodiments, for example, may advantageously help facilitate content selection and usage consistent with applicable privacy and/or data-usage rules. For example, some embodiments may advantageously prevent fitness analytics accuracy being hampered by edited video data and/or inconsistent exercise labels. Some embodiments, for example, may advantageously keep cross-exercise and cross-region fitness comparisons current without manual recalculation while supporting reliable cross-user benchmarking over time. For example, some embodiments may advantageously identify functional-fitness strengths across different exercise types and geographic locations. Some embodiments, for example, may advantageously reduce human errors in exercise classification and improve accuracy of downstream performance evaluation analytics. For example, some embodiments may advantageously provide real-world, community-verified motion data with geographic diversity and a full provenance chain while maintaining an auditable chain of custody and supporting fairness and integrity assessments without exposing underlying sensitive content.

The details of various embodiments are set forth in the accompanying drawings and the description below. Other features and advantages will be apparent from the description and drawings, and from the claims.

BRIEF DESCRIPTION OF THE DRAWINGS

FIGS. 8A, 8B, 8C, 8D, 8E, 8F, 8G, 8H, 8I, and 8J show exemplary data structures of a GMIS.

Like reference symbols in the various drawings indicate like elements.

DETAILED DESCRIPTION OF ILLUSTRATIVE EMBODIMENTS

To aid understanding, this document is organized as follows. First, to help introduce discussion of various embodiments, a global movement intelligence system is introduced with reference to FIGS. 1-4. Second, that introduction leads into a description with reference to FIGS. 5-7 of some exemplary embodiments of tamper-proof benchmark performance evaluation, geo-normalized scoring, and bio-signature based exercise classification. Third, with reference to FIGS. 8A-8J, the data structures of the global movement intelligence system are described in application to exemplary movement-processing, validation, and scoring workflows. Finally, the document discusses further embodiments, exemplary applications, and aspects relating to performance analytics, dataset provenance, and AI-training integration.

Figure 1:
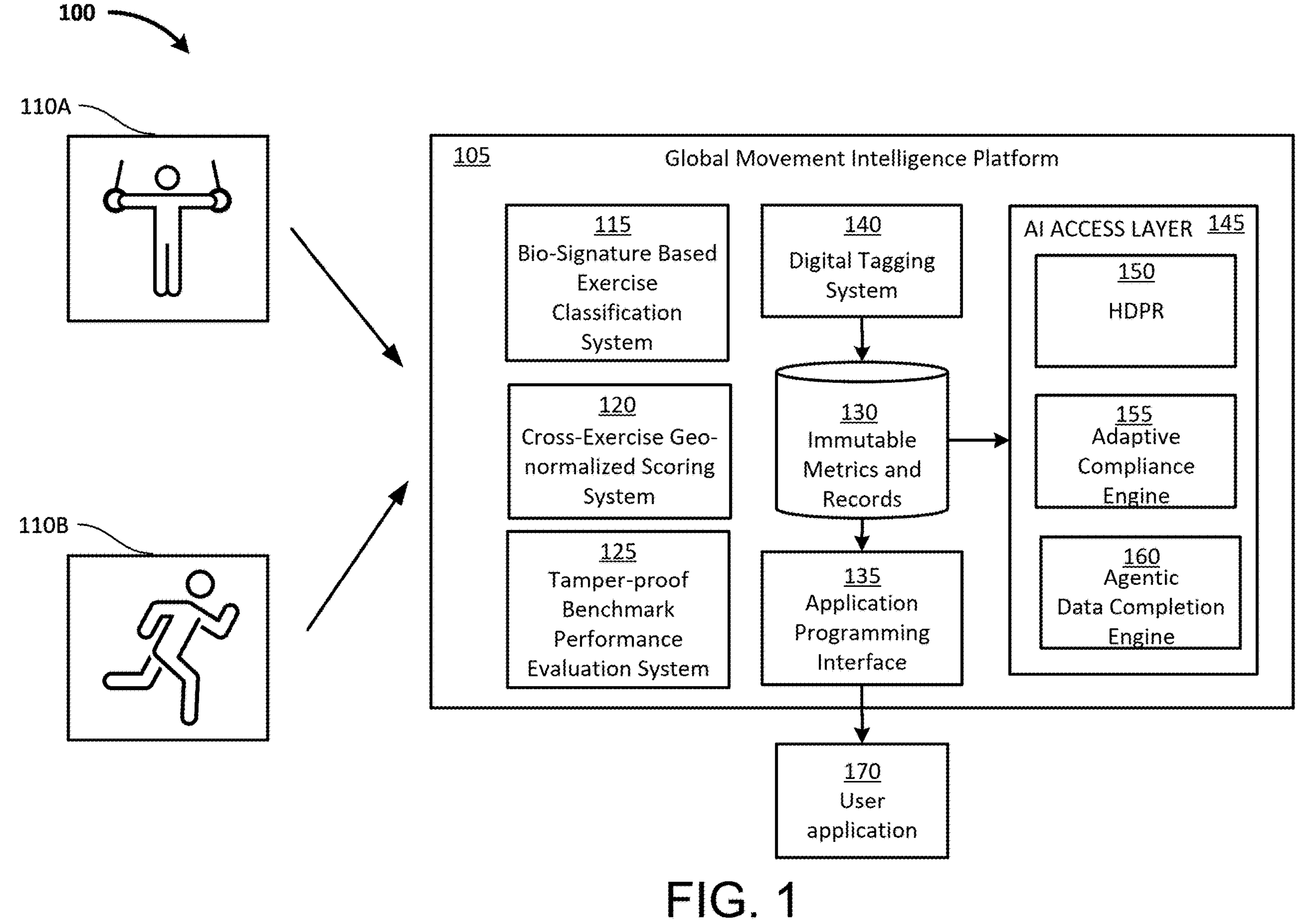
FIG. 1 depicts an exemplary global movement intelligence system (GMIS) employed in an illustrative use-case scenario.

FIG. 1 depicts an exemplary global movement intelligence system (GMIS 100) employed in an illustrative use-case scenario. For example, an external application may access the GMIS 100 to process human movement data. For example, the GMIS 100 may transform human movement data into digital assets. For example, various external platforms may use the digital assets to perform cross-exercise cross-location biomechanical comparisons. For example, some platforms may use the digital assets to perform. fitness benchmarking. For example, some platforms may use the digital assets to perform large-scale data licensing for AI training.

In this example, the GMIS 100 includes a global movement intelligence platform (GMIP 105). For example, the GMIP 105 may receive video data representing one or more physical-exercise performances. Based on the received video data, the GMIP 105 may execute computational operations to classify the physical-exercise performances. For example, the GMIP 105 may generate immutable performance records suitable based on physical-exercise performances classifications.

In some implementations, the GMIP 105 may be a central server. The central server implementation may, for example, provide a unified environment for receiving or processing movement data. In some implementations, the GMIP 105 may be a distributed server architecture. The distributed server architecture may, for example, increase geographic coverage or reduce latency for regional data ingestion. In some implementations, the GMIP 105 may be a blockchain-based machine configuration. The blockchain-based machine configuration may, for example, facilitate immutable storage characteristics or decentralized integrity tracking.

As shown in this example, the GMIP 105 receives a first performance data 110A and a second performance data 110B. For example, the first performance data 110A and the second performance data 110B may, for example, include a continuous video stream captured by a mobile camera sensor. The first performance data 110A and the second performance data 110B may, for example, include metadata-synchronized motion signals acquired from a wearable device. The first performance data 110A and the second performance data 110B may, for example, include a sequence of video frames transmitted through a network interface. In this example, the first performance data 110A is a video data of a user performing an upper-body exercise (e.g., push-ups, pull-ups, shoulder presses, biceps curls, overhead presses). The second performance data 110B is a video data of a user performing a lower-body exercise (e.g., squats, lunges, step-ups, box jumps, deadlifts).

The GMIP 105 includes a bio-signature based exercise classification system (BSBECS 115), a cross-exercise geo-normalized scoring system (CEGNSS 120), and a tamper-proof benchmark performance evaluation system (TBPES 125). The BSBECS 115 may, for example, process human-movement data representing physical exercises. The BSBECS 115 may, for example, transform a sequence of video frames into a set of body-landmark coordinates. The BSBECS 115 may, for example, transform the body-landmark coordinates into exercise-identification data. For example, the BSBECS 115 may link a movement pattern to a classified exercise type or an identified exercise variation.

The CEGNSS 120 may, for example, process performance records generated from validated exercise executions. The CEGNSS 120 may, for example, transform a collection of performance records into ranking values within a specified geographic region. The CEGNSS 120 may, for example, transform the ranking values into geo-normalized scores stored in association with users and exercise categories. The TBPES 125 may, for example, process recordings of benchmark routines submitted for evaluation. The TBPES 125 may, for example, transform continuous video streams into frame-continuity assessments. In some examples, the frame-continuity assessments may indicate whether disruptions or edits are present. The TBPES 125 may, for example, transform the frame-continuity assessments and associated timing data into validated benchmark records for recorded routines.

In the depicted example, the GMIP 105 includes an immutable metrics and records (IMAR 130). The IMAR 130 is accessible by an application programming interface (API 135). For example, the IMAR 130 may store performance records for multiple users. For example, the IMAR 130 may store predefined biomechanical criteria for one or more exercise types. For example, the IMAR 130 may receive data from the TBPES 125, the CEGNSS 120, and/or the BSBECS 115. In some implementations, the IMAR 130 may include append-only data structures associated with stored records. For example, the IMAR 130 may create a new entry when a record is updated and may retain earlier entries without overwriting the earlier entries. In some implementations, the IMAR 130 may include version-identification fields associated with stored records. For example, the IMAR 130 may assign a monotonically increasing version value to each new entry related to a given record lineage. In some implementations, the IMAR 130 may include cryptographic hash values associated with stored records. For example, the IMAR 130 may generate a hash based on contents of a record and may store the hash with the record as an integrity indicator. For example, the IMAR 130 may detect a modification when a newly computed hash for a retrieved record differs from a stored hash. In some implementations, the IMAR 130 may include time-sequenced write operations associated with record creation events. For example, the IMAR 130 may record a timestamp and a writer identifier for each append operation, which may reduce a risk of undetected retroactive modification of historical entries.

As shown, a user device 170 may access the IMAR 130 through the API 135. In some embodiments, the API 135 may be implemented as a network-facing interface component. For example, the API 135 may receive requests from the user device 170 over a wired communication link or a wireless communication link. The API 135 may include one or more programmatically callable endpoints. For example, the API 135 may provide endpoints for submitting performance data (e.g., the first performance data 110A, the second performance data 110B). For example, some endpoints may receive performance data (e.g., the first performance data 110A, the second performance data 110B). For example, some endpoints may return stored records from the IMAR 130. For example, some endpoints may return derived metrics generated using data stored in the IMAR 130. In some examples, the API 135 may accept requests encoded as JavaScript Object Notation (JSON) messages and/or protocol buffer messages.

In some examples, the API 135 may include a response-serialization format. For example, the API 135 may return responses that include structured records retrieved from the IMAR 130. The API 135 may include an authentication mechanism. For example, the API 135 may process requests containing access tokens, cryptographic signatures, or credential headers. The API 135 may include parameter fields for identifying users, exercises, or time ranges. For example, the API 135 may accept query parameters that specify a user identifier, an exercise identifier, a geographic region, or a time window associated with requested records. The API 135 may include rate-handling logic. For example, the API 135 may manage a frequency of incoming requests, which may reduce a risk of resource exhaustion within the IMAR 130. For example, the API 135 may manage a frequency of incoming requests from the user device 170, which may reduce a risk of resource exhaustion within the IMAR 130.

In this example, the GMIP 105 includes a digital tag system (DTS 140) and an artificial intelligence access layer (AIAL 145). For example, the AIAL 145 may be a processing layer between external artificial-intelligence services and resources within the GMIP 105. The AIAL 145 may, for example, include model-facing interfaces. As an illustrative example, the AIAL 145 may receive data-access requests from large-language models through the model-facing interfaces.

For example, based on output-generation logic, the AIAL 145 may provide response payloads including, for example, training datasets, subsets of performance records, aggregated statistics derived from data stored in the IMAR 130. The output-generation logic may include policy-evaluation logic. For example, the AIAL 145 may compare information in a received request against stored output generation rules (e.g., consent rules, jurisdictional limitations, data-usage restrictions) before selecting data for a response.

In some implementations, the DTS 140 may generate tags to qualify one or more entries in the IMAR 130. For example, the DTS 140 may assign a digital tag value to each performance record or metadata object stored in the IMAR 130. The DTS 140 includes association structures. For example, the DTS 140 may maintain mappings between digital tag values, corresponding performance records, public attributes, and private attributes. The DTS 140 includes integrity-indicator fields. For example, the DTS 140 may store cryptographic hash values or checksum values that are derived from selected fields of a tagged record. The DTS 140 includes historical-linkage mechanisms. For example, the DTS 140 may maintain links between earlier attribute entries and later attribute entries that are associated with a same digital tag value. The DTS 140 includes retrieval functions. For example, the DTS 140 may return tag-associated attributes or record identifiers when a component such as the AIAL 145 or the API 135 supplies a digital tag value. Various implementations of the DTS 140 are further described in detail in U.S. Pat. No. 11,748,704, which has at least one co-inventor of this application.

As shown, the AIAL 145 includes a Historical Data Provenance Register (HDPR 150), an adaptive compliance engine (ACE 155), and an agentic data completion engine (ADCE 160). For example, the HDPR 150 may record data collected or exported before the enforcement of new jurisdictional regulations. For example, the HDPR 150 may include provenance-status fields for each entry in the HDPR 150. For example, the HDPR 150 may record whether a dataset was collected before or after a regulatory cutoff date. For example, the HDPR 150 may record a grandfather-status indicator associated with that dataset. For example, the HDPR 150 may maintain links between provenance entries and licensing or transaction records so that an auditable chain of custody is provided as a register.

The ACE 155 may include a policy-evaluation logic configured to modify an output of the AIAL 145. For example, the ACE 155 may update the policy-evaluation logic based on regulation change (e.g., new legislation, guidance, policy interpretation update).

For example, the ACE 155 may store machine-readable rules that correspond to statutory or regulatory frameworks (e.g., regional data-protection laws, AI-governance requirements). For example, the ACE 155 may assign compliance labels to datasets based on provenance attributes, jurisdiction information, and/or consent descriptors retrieved from the HDPR 150 and the. The ACE 155 includes monitoring and update mechanisms.

The ADCE 160 includes contextual-enrichment structures. For example, the ADCE 160 may generate or update metadata fields (e.g., e demographic attributes, exercise or movement categories, environmental characteristics, device characteristics, cross-referenced performance metrics) associated with data objects stored in the IMAR 130. The ADCE 160 includes valuation-computation logic. For example, the ADCE 160 may compute a Provenance-Valuation Index score for a data object based on a data object's regulatory and/or ethical integrity. For example, the PVI score may be generated as a function of weighted components (e.g., consent integrity, metadata completeness, contextual diversity, data quality, regulatory-readiness indicators).

The ADCE 160 includes fairness and integrity assessment mechanisms. For example, the ADCE 160 may generate fairness scores, inclusion scores, and contextual-integrity scores for datasets based on diversity and representativeness metrics. The ADCE 160 includes metadata-based learning and data-completion mechanisms. For example, the ADCE 160 may generate privacy-preserving embeddings or contextual vectors derived from tags, provenance relationships, valuation scores, and aggregate statistics so that downstream AI systems train on metadata representations while underlying content remains encrypted or access-controlled.

The AIAL 145 includes request-handling interfaces that interact with external AI or analytics systems. For example, the AIAL 145 may receive data-access requests or training-job configuration requests from large language models, computer-vision model trainers, recommendation engines, and/or other AI-training software.

As an illustrative example without limitation, the AIAL 145 may include orchestration logic coordinating the HDPR 150, the ACE 155, and the ADCE 160. For example, the AIAL 145 may route a received request to the HDPR 150 for provenance lookup, to the ACE 155 for rule evaluation and compliance labeling, and to the ADCE 160 for contextual enrichment, valuation scoring, and generation of privacy-preserving training views. The AIAL 145 may include interfaces to multi-form learning workflows associated with the GMIP 105.

The AIAL 145 may, for example, access a provenance ledger maintained in association with the DTS 140 and the IMAR 130. For example, the provenance ledger may store consent history, ownership history, licensing terms, expiration information, transaction records, and PVI values for datasets identified by digital tags. For example, the provenance ledger may support generation of audit trails or licensing reports for data used in artificial-intelligence training workflows. The ADCE 160 may use PVI values and provenance attributes as a basis for dataset valuation. For example, the ADCE 160 may weight dataset valuation toward regulatory durability, provenance quality, and ethical sourcing indicators so that pricing or prioritization is influenced by compliance characteristics rather than short-term market conditions. The AIAL 145 may interact with data structures that represent Global Fast Fit benchmarks, Local Records, and a Global Human Performance Index. For example, the AIAL 145 may provide training views or analytics outputs that combine benchmark scores, local performance records, and human-performance index values across health, fitness, or other deployment domains.

Figure 2:
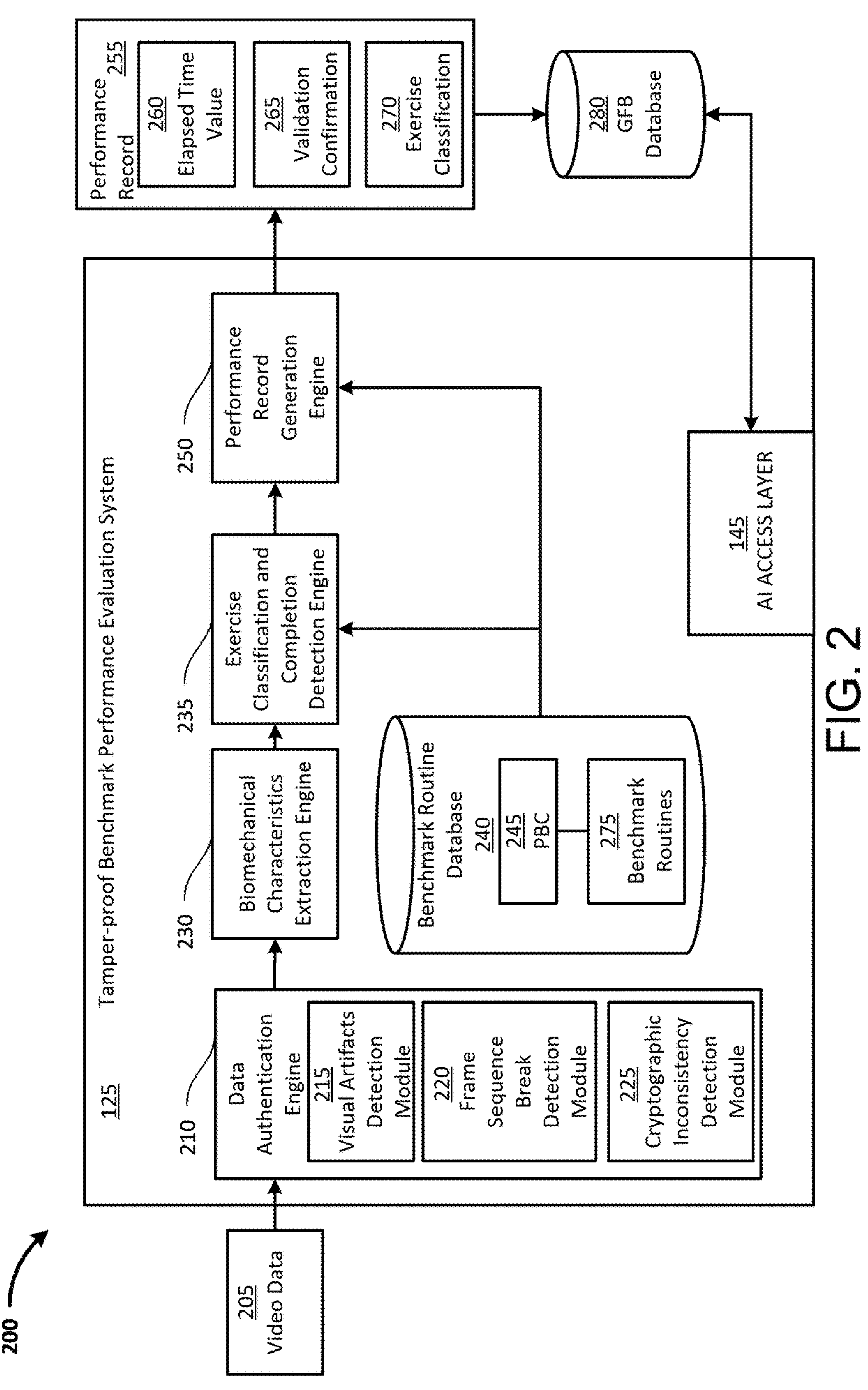
FIG. 2 shows a block diagram of an exemplary tamper-proof benchmark performance evaluation system (TBPES).

FIG. 2 shows a block diagram of an exemplary tamper-proof benchmark performance evaluation system (TBPES). As shown in an example system 200, the TBPES 125 receive a video data 205. For example, the video data 205 may include a continuous sequence of image frames captured by a camera of a user device during an exercise session. For example, the video data 205 may include frame-level time-stamps generated by recording hardware or an operating system. For example, the video data 205 may include encoding metadata such as resolution, frame rate, compression format, or device identifiers. In some examples, the video data 205 may include synchronized auxiliary signals such as inertial sensor readings or orientation indicators. For example, the video data 205 may represent a recording of a user performing a benchmark routine having a sequence of physical exercises.

The TBPES 125 includes a data authentication engine (DAE 210). For example, DAE 210 may receive the video data 205 and associated metadata before other components of the TBPES 125 operate on the video data 205. For example, DAE 210 may generate indicators describing whether the video data 205 exhibits signs of editing, frame removal, or timestamp manipulation. For example, DAE 210 may generate authentication results that are used by downstream components of the TBPES 125 when determining whether a benchmark routine is accepted as a continuous recording.

The DAE 210 includes a visual artifacts detection module (VADM 215), a frame sequence break detection module (FSBDM 220), and a cryptographic inconsistency detection module (CIDM 225). For example, the VADM 215 may process the video data 205 using image analysis. For example, VADM 215 may detect visual artifacts in successive frames of the video data 205. For example, the VADM 215 may identify abrupt changes in color. For example, the VADM 215 may identify abrupt changes brightness. For example, the VADM 215 may identify abrupt changes blocking patterns. For example, the VADM 215 may identify abrupt changes edge structures. For example, some abrupt changes may indicate editing (e.g., insertion, deletion, recompression of frame segments) of the video data 205. In some implementations, the VADM 215 may generate a signal (e.g., artifact flags, scores) indicating a predetermined likelihood of the video data 205 being visually edited.

In some implementations, the FSBDM 220 may process the video data 205 using a temporal-analysis. For example, the FSBDM 220 may examine frame data (e.g., frame indices, presentation timestamps, capture timestamps) to identify gaps or other abnormal frame progressions. For example, the FSBDM 220 may generate continuity indicators when an uninterrupted recording is detected.

In some implementations, the CIDM 225 may process the video data 205 using a cryptographic analysis. For example, CIDM 225 may apply a cryptographic consistency check to timestamp metadata. For example, the timestamp data may be frame-header metadata. For example, the timestamp data may be generated by a recording device capturing the video data 205. For example, the timestamp data may be extracted from the video data 205. For example, CIDM 225 may recompute hash values for successive metadata elements. For example, the CIDM 225 may verify digital signatures extracted from the frame cryptographic data. In some implementations, the CIDM 225 may generate inconsistency indicators when a mismatch is detected between expected values and stored values.

In this example, the TBPES 125 includes a Biomechanical Characteristics Extraction Engine (BCEE 230) and an Exercise Classification and Completion Detection Engine (ECCDE 235). For example, the BCEE 230 may process the video data 205. For example, the video data 205 may be validated as a continuous stream by the DAE 210. For example, the BCEE 230 may apply a pose detection model to the video data 205. For example, based on the pose detection model, the BCEE 230 may identify a plurality of body landmarks at each sample video frame. For example, the BCEE 230 may associate each body landmark with a three-dimensional position coordinate associated with each frame. For example, the BCEE 230 may generate joint angles between connected body landmarks based on the three-dimensional position coordinates. For example, the BCEE 230 may generate movement trajectories of the body landmarks based on changes in the three-dimensional position coordinates across the video data 205. For example, the BCEE 230 may determine biomechanical characteristics exhibited by a user based on the joint angles and the movement trajectories (e.g., range of motion values, movement velocity measurements, relative spatial positioning between the body landmarks).

For example, the ECCDE 235 may receive the biomechanical characteristics generated by the BCEE 230. In some implementations, the ECCDE 235 may retrieve, from a benchmark routine database (BRDB 240), predefined biomechanical criteria (PBC 245). For example, the BRDB 240 may be included in the IMAR 130 described with reference to FIG. 1. For example, the BRDB 240 may store entries of the PBC 245 related to benchmark routines 275. For example, the benchmark routines 275 may include sequences of exercises. The PBC 245 may include completion requirements of each exercise in a sequence of exercise.

For example, the PBC 245 may store biomechanical thresholds for exercises of the benchmark routines 275 (e.g., ranges of joint angles, ranges of motion, movement velocities, relative positioning patterns). For example, the ECCDE 235 may compare the biomechanical characteristics generated by the BCEE 230 with the biomechanical thresholds in the PBC 245. Based on the comparison, the BCEE 230 may assign an exercise classification. For example, the BCEE 230 may assign the exercise classification when the biomechanical characteristics align with an entry of the exercise classification stored in the PBC 245.

In some examples, alignment between biomechanical characteristics and biomechanical thresholds may be evaluated on a parameter-by-parameter basis. For example, the ECCDE 235 may determine that a measured joint-angle value aligns with a stored joint-angle threshold when the measured joint-angle value falls within a tolerance interval defined by the threshold. For example, ECCDE 235 may determine that a range-of-motion value aligns with a stored range-of-motion requirement when a difference between the measured range and a stored range is less than a deviation limit. For example, the ECCDE 235 may determine that a movement-velocity value aligns with a stored movement-velocity target when a normalized speed metric falls within a defined band around the target. For example, ECCDE 235 may evaluate relative positioning patterns by comparing direction vectors or distances between body landmarks over time with patterns stored in the PBC 245 and may generate a similarity score. For example, ECCDE 235 may generate an overall alignment score for an exercise instance by aggregating parameter-level alignment indicators and may treat the exercise instance as matching an entry stored in the PBC 245 when the overall alignment score exceeds a classification threshold.

For example, the ECCDE 235 may monitor a time-ordered series of classified exercise in the video data 205. For example, the ECCDE 235 may determine that completion conditions for a final required exercise of the benchmark routines 275 stored in the BRDB 240 have been satisfied. For example, the ECCDE 235 may generate a routine-completion indication to the performance record generation engine 250 based on that determination.

Upon the routine-completion indication is received, the performance record generation engine 250 may generate a performance record 255. For example, the performance record generation engine 250 may, for example, retrieve an elapsed time value 260, a validation confirmation 265, and an exercise classification 270. The performance record generation engine 250 may, for example, receive the elapsed time value 260 from the ECCDE 235 as a duration between a start timestamp and an end timestamp determined for a user performed benchmark routine extracted from the video data 205. The performance record generation engine 250 may, for example, receive the validation confirmation 265 from the DAE 210 or from the ECCDE 235 as an indicator that the video data 205 satisfied continuity and authenticity requirements associated with the benchmark routines 275. The performance record generation engine 250 may, for example, receive the exercise classification 270 from the ECCDE 235 as one or more exercise identifiers that correspond to biomechanical entries stored in the PBC 245 or to the benchmark routines 275.

In the depicted example, the performance record 255 includes the elapsed time value 260, the validation confirmation 265, and the exercise classification 270. The elapsed time value 260 may, for example, store a numeric representation of total benchmark routine duration expressed in units of seconds or milliseconds. The validation confirmation 265 may, for example, include a metadata field (e.g., a flag, a confidence measure, a code) indicating whether the video data 205 passed authentication validation by the DAE 210. The exercise classification 270 may, for example, store one or more identifiers that represent exercise types detected for the benchmark routines 275.

In this example, the TBPES 125 includes the AIAL 145. In some implementations, the AIAL 145 may interact with the TBPES 125 by receiving training-data requests that reference performance records 255. The AIAL 145 may, for example, request performance records 255 based on identifiers associated with the benchmark routines 275. The AIAL 145 may, for example, select subsets of the performance record 250 for use by external artificial-intelligence models that learn scoring rules or movement patterns. The AIAL 145 may, for example, advantageously generate output datasets that are compliant to privacy rules based on digital tags managed by the DTS 140. As shown, a global fitness benchmarking database (GFB database 280) may store the performance record 255 generated by the TBPES 125. For example, the AIAL 145 may access the GFB database 280 to retrieve historical content generated by the TBPES 125.

In various implementations, a benchmark routine performance evaluation system may transform raw video (e.g., the video data 205) into a performance record (e.g., the performance record 255). In some implementations, the benchmark routine performance evaluation system may automatically authenticate the raw video to be performed in a single, unedited continuous video stream (e.g., using the DAE 210). For example, the benchmark routine performance evaluation system may extract biomechanical signals from frames of the video stream (e.g., using the BCEE 230). Based on the extracted biomechanical signals, for example, the benchmark routine performance evaluation system may generate the performance record associated with automatically classicized exercise type. Various implementations may advantageously prevent fitness analytics accuracy being hampered based on edited video data and/or on inconsistent exercise labels.

In a conventional benchmark routine performance evaluation system, metadata of an uploaded video of a user performing exercises may typically be provided by the user (e.g., based on user-provided exercise labels, timing data). In such systems, for example, a computer generally operates as a passive retrieval engine for video files and timestamps. For example, continuity of a benchmark routine may be inferred from file length or user attestations. For example, user edited or spliced videos may adversely affect overall accuracy of a performance evaluation process. In some examples, human error, including error in labeling a performed exercise (e.g., depending on a user's designated exercise type) may lead to inconsistent or biased scoring results.

In contrast, the TBPES 125 may perform automated integrity analysis on the video data 205. For example, the DAE 210 may identify continuous, untampered recordings without human review. For example, ECCDE 235 may compare biomechanical characteristics against the PBC 245 and benchmark routines stored in BRDB 240 to determine, based on body landmarks extracted by the BCEE 230, whether a required exercise is performed. Accordingly, for example, the TBPES 125 may advantageously increase the reliability of the performance record 255. For example, the TBPES 125 may provide a technical solution to a technical problem of enabling a computer system to automatically perform integrity validation and biomechanical evaluation of benchmark routine videos at scale. For example, the TBPES 125 may provide a technical solution to a technical problem of enabling comparison of like exercises in situations where user-tampered video data or incorrect exercise labeling may reduce reliability of benchmark performance evaluations.

Figure 3:
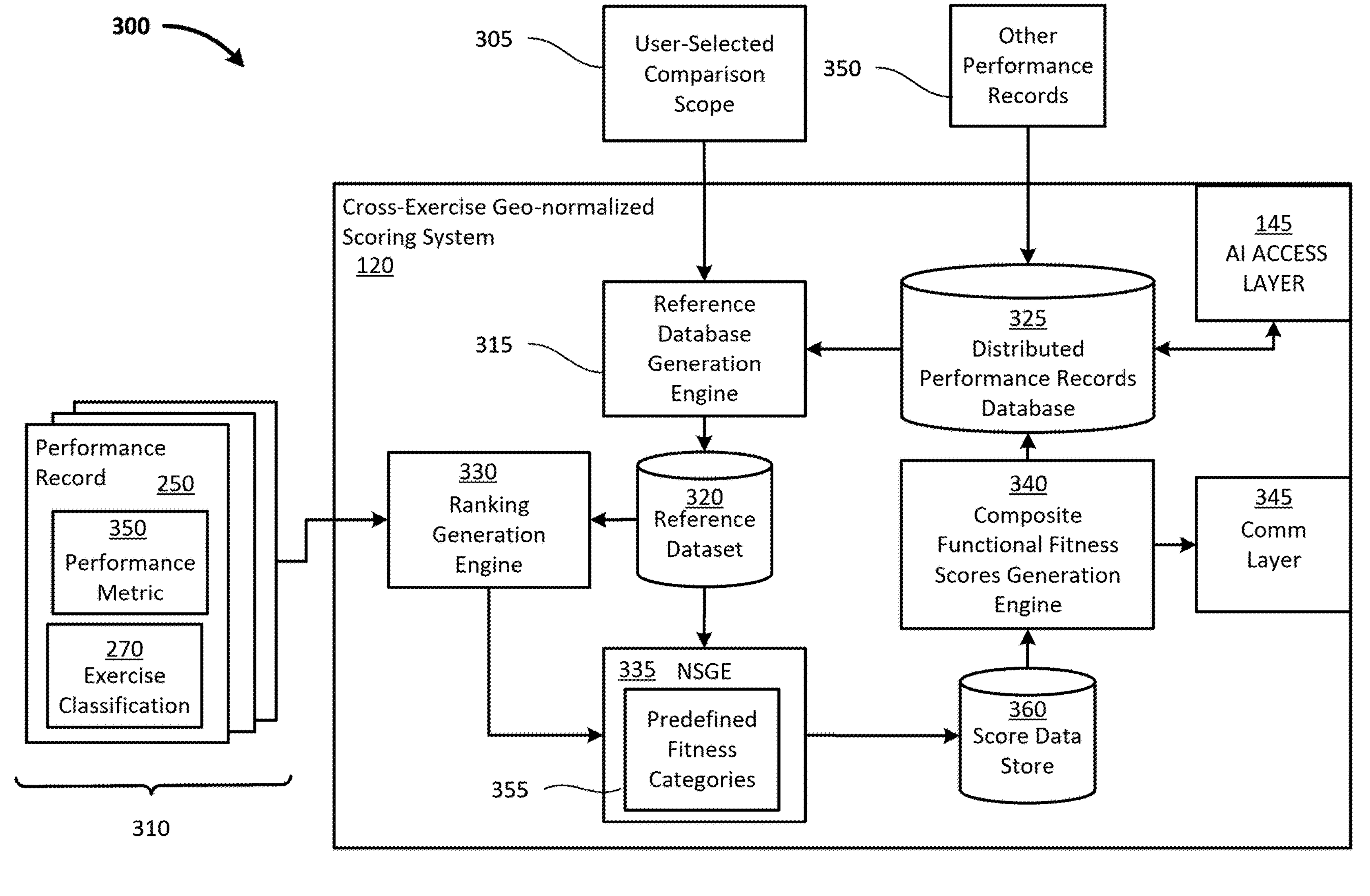
FIG. 3 shows a block diagram of an exemplary cross-exercise geo-normalized scoring system (CEGNSS).

FIG. 3 shows a block diagram of an exemplary cross-exercise geo-normalized scoring system (CEGNSS). In this example system 300, the CEGNSS 120 receives a user-selected comparison scope 305 and one or more performance records 310. As shown, the one or more performance records 310 includes multiple performance record 255.

The CEGNSS 120 includes a reference database generation engine (RDGE 315) to process the user-selected comparison scope 305. For example, the RDGE 315 may receive the user-selected comparison scope 305 indicating a local scope, a regional scope, or a global geographic scope. The local scope may, for example, represent a geographic area surrounding a current user location (e.g., city, postal region, radius-based zone) derived from coordinates associated with the performance records 310. The regional scope may, for example, represent a broader administrative area (e.g., state, province, multi-country region identified by region codes associated with performance records stored in the distributed performance records database 325). The global geographic scope may, for example, represent selection without a limiting regional boundary (e.g., performance records from multiple regions, multiple countries, worldwide datasets) that have valid coordinates in the distributed performance records database 325.

For example, the RDGE 315 may generate query parameters based on the user-selected comparison scope 305, a performance records 310 associated with a user, and one or more exercise-type identifiers contained in the performance records 310. For example, the RDGE 315 may query a distributed performance records database 325 (e.g., using the generated query parameters). For example, the RDGE 315 may apply geographic filters to select performance records whose geographic coordinates fall within a boundary associated with the user-selected comparison scope 305 to generate a reference dataset 320. For example, the RDGE 315 may apply additional filters based on data-quality indicators so that performance records that fail predefined thresholds are excluded from the query results. For example, the RDGE 315 may assemble the filtered performance records into the reference dataset 320. For example, the reference dataset 320 may include performance record from a population of users selected from the distributed performance records database 325 based on the user-selected comparison scope 305.

In some embodiments, the system may automatically generate a dataset-quality score for each performance record. The dataset-quality score may include weighted sub-scores for video capture quality (e.g., frame continuity, resolution, timestamp integrity), biomechanical completeness (e.g., landmark coverage, pose confidence), contextual metadata completeness (e.g., geographic coordinates, facility type, recording environment), and/or consent/provenance completeness (e.g., ownership lineage, consent-scope coverage). The CEGNSS 120 may apply the dataset-quality score during scoring, ranking, or marketplace export to filter or rank records without reprocessing the underlying video.

As shown, the CEGNSS 120 includes a ranking generation engine (RGE 330), and a normalized score generation engine (NSGE 335). For example, the RGE 330 may retrieve the exercise classification 270 from the performance record 255 selected from the performance records 310. For example, the RGE 330 may select from the reference dataset 320, a subset of performance records having the exercise classification 270. For example, the RGE 330 may extract performance metric 350 from the performance record 255 to determine a position of the user relative to other users in the reference dataset 320. For example, the RGE 330 may compute a percentile value for the performance metric 350 stored in the performance record 255 as a function of ordered performance metric 350 in the reference dataset 320.

For example, NSGE 335 may transform the percentile value into a normalized score between a predetermined lower bound and a predetermined upper bound. The NSGE 335 includes a set of predefined fitness categories 355. For example, the predefined fitness categories 355 may include various categories in evaluating body fitness (e.g., upper body strength, core strength, lower body strength, cardiovascular endurance, speed, balance, flexibility). For example, the NSGE 335 may assign the exercise classification 270 associated with the percentile value to one of the predefined fitness categories 355. For example, the NSGE 335 may store the functional fitness normalized score in a score data store 360. For example, the score data store 360 may, for each functional fitness category, a highest normalized score achieved by the user based on normalized scores in each functional fitness category.

Based on the rankings in the fitness categories, a composite functional fitness score generation engine (CFFSGE 340) may generate a composite score of the user. For example, CFFSGE 340 may receive a set of normalized scores of a user indexed by functional fitness category identifiers stored in the score data store 360. In some implementations, the CFFSGE 340 may include category-level aggregation logic. For example, CFFSGE 340 may identify, for each functional fitness category identifier associated with the user, a highest normalized score among normalized scores stored for that category identifier. In some implementations, the CFFSGE 340 may include composite-score computation logic. For example, CFFSGE 340 may generate a composite functional fitness score for the user by combining the highest normalized scores identified across the functional fitness category identifiers. In some implementations, the CFFSGE 340 may include result-output logic. For example, CFFSGE 340 may store the composite functional fitness score in the distributed performance records database 325. In some examples, the CFFSGE 340 may transmit composite functional fitness scores to another device through a communication layer 345. As shown, the AIAL 145 may access the or to the AIAL 145 distributed performance records database 325 for data retrieval.

As an illustrative example without limitation, a first user located in India may submit a performance record 255 for a running exercise that is classified by ECCDE 235 based on the exercise classification 270 as belonging to a cardiovascular endurance category. For example, the Indian running performance record may include a first performance metric value representing a distance covered within a fixed time interval. For example, the RGE 330 may determine a ranking for the performance metric value relative to performance metric 350 of other users who performed the same running exercise within the reference dataset 320. For example, the RGE 330 may generate a percentile value based on that ranking. For example, the NSGE 335 may transform the percentile value into a normalized score within a predetermined range and may associate the normalized score with the cardiovascular endurance category for the first user. In a separate session, the first user may submit an additional performance record 255 for a core exercise, e.g., plank hold, sit-up variation, rotational core movement, that is classified as belonging to a core strength category, and the CEGNSS 120 may generate a normalized score associated with the core strength category for that record.

For example, a second user located in England may submit a performance record 255 for a barbell exercise that is classified as an exercise classification 270 belonging to an upper body strength category. For example, the barbell performance record 255 may include a performance metric 350 representing a one-repetition maximum or a total number of repetitions at a specified load. For example, the RGE 330 may determine a ranking for the performance metric 350 relative to performance metric 350 of other users who performed the same barbell exercise within the reference dataset 320 and may compute a percentile value based on that ranking. For example, the NSGE 335 may transform the percentile value into a normalized score within the predetermined range and may associate the normalized score with the core strength category for the second user. In some implementations, the second user may submit additional performance records 310 for other exercises, e.g., assisted squats, adaptive cardio protocols, balance-oriented movements, and the CEGNSS 120 may generate normalized scores associated with corresponding functional fitness categories for those records.

For each user, for example, the CFFSGE 340 may identify a highest normalized score among normalized scores stored for performance records 310 that belong to that functional fitness category. For example, the CFFSGE 340 may combine the highest normalized scores across functional fitness categories for the first user, and the highest normalized scores across functional fitness categories for the second user. For example, CFFSGE 340 may compare the composite functional fitness score of the first user and the composite functional fitness score of the second user. For example, the CEGNSS 120 may advantageously generate a cross-user geographically normalized comparison result that reflects relative functional fitness across different exercise types and geographic locations.

In various implementations, a cross-exercise geo-normalized scoring system (e.g., the CEGNSS 120) may dynamically build a scoped (e.g., geographically, demographically) bounded reference dataset (e.g., the reference dataset 330) from a distributed performance-records database (e.g., the distributed performance records database 325). For example, the cross-exercise geo-normalized scoring system may convert user's rankings within the scope into normalized scores mapped to functional fitness categories (e.g., the predefined fitness categories 355). Based on the normalized score, the CEGNSS 120 may generate a composite fitness score associate with each user. For example, users who perform different exercises in different locations may advantageously be compared on a common functional-fitness scale. As new validated performance records arrive, for example, the system may automatically refresh the rankings and normalized scores so that cross-exercise, cross-region comparisons remain current without human intervention.

In a conventional fitness scoring system, scores for users are often tracked separately based on each exercise or event, and comparisons across different exercises or locations may depend on manual spreadsheets, static lookup tables, or coach-defined conversion charts. In such systems, for example, a computer may store raw results and basic leaderboards but generally operates as a passive repository for user-entered scores and user-selected groupings. For example, geographic differences in participation or performance levels may not be accounted for, so rankings generated in a small local gym and rankings generated in a high-performance training center may be treated as equivalent. For example, when new scores are entered, percentile tables or conversion charts may be updated manually or may remain outdated, which may reduce reliability of cross-user comparisons over time.

In some implementations, the CEGNSS 120, by generating the reference dataset 320 dynamically from a distributed performance records database 325 based on a user-selected comparison scope 305, the RGE 330 may compute rankings and percentile values based on performance metric 350 of the performance records 310 within the reference dataset 320. For example, the CFFSGE 340 may generate composite functional fitness scores for comparing performance between users based on the predefined fitness categories 355, even if some users performed different exercises at different locations. For example, in response to new performance records written to the distributed performance records database 325, the CEGNSS 120 may regenerate rankings, normalized scores, and composite scores by re-querying the reference dataset 320 to maintain up-to-date cross-exercise, cross-region fitness comparisons without manual recalculation.

Figure 4:
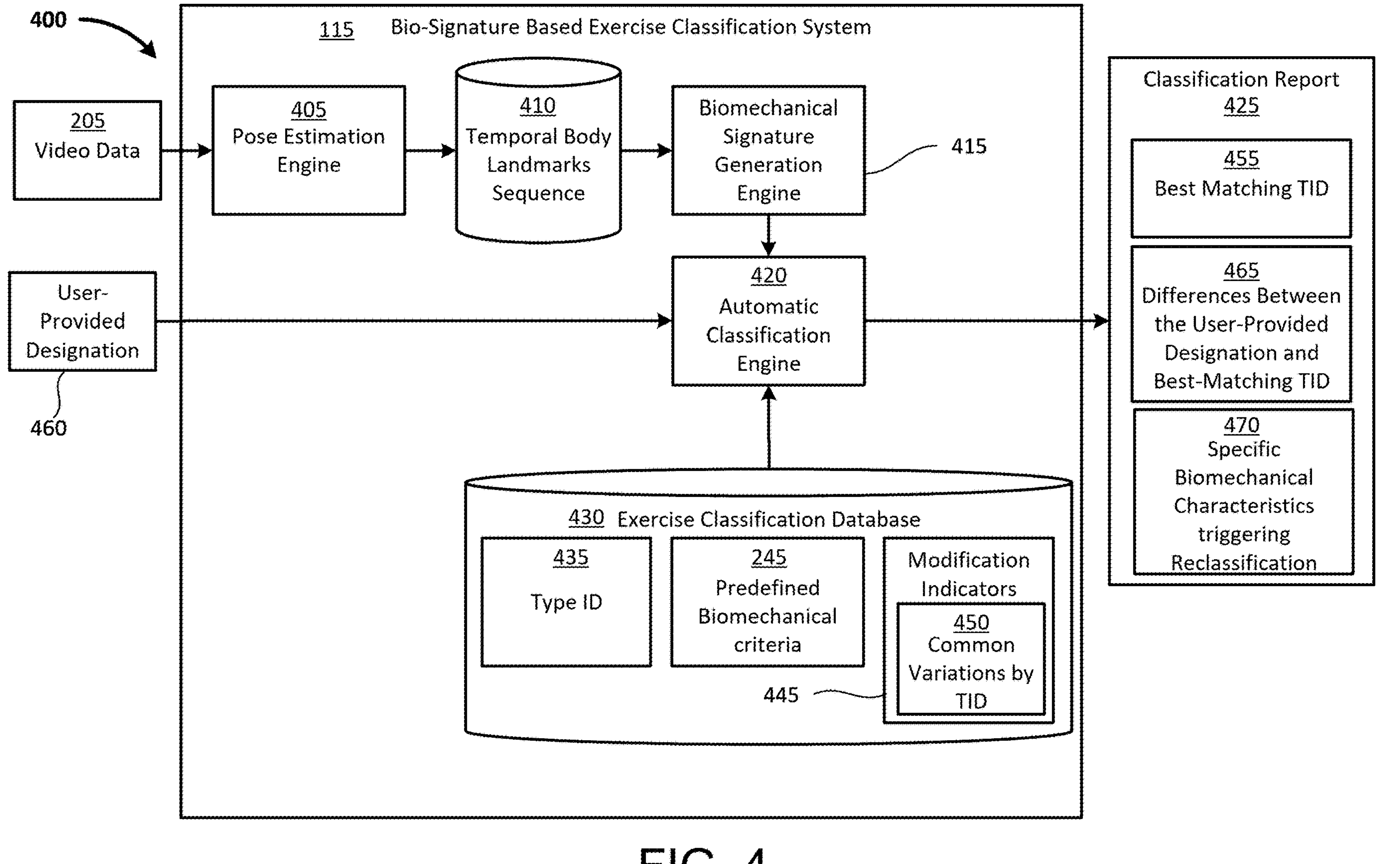
FIG. 4 shows a block diagram of an exemplary bio-signature based exercise classification system (BSBECS).

FIG. 4 shows a block diagram 400 of an exemplary bio-signature based exercise classification system (BSBECS). As shown, the BSBECS 115 receive the video data 205. For example, the BSBECS 115 may classify the video data 205 into exercise classifications 270 associated with one or more exercise types. For example, a user may record a workout session that includes different segments such as push-up sets, running intervals, squat sets, or plank holds. For example, the BSBECS 115 may analyze the video data 205 to determine an exercise type corresponds to a performance in the video data 205.

In the depicted example, the video data 205 is processed by a pose estimation engine (PEE 405). For example, the PEE 405 may extract body landmarks from each processed video frame. As shown, the PEE 405 may generate a temporal body landmarks sequence (TBLS 410). For example, the TBLS 410 may include a data structure of a series of body landmark information over time. The TBLS 410 may, for example, store, for each sample video frame, a frame index, a timestamp, and a set of landmark identifiers. TBLS 410 may, for example, store, for each landmark identifier, a corresponding position coordinate (e.g., two-dimensional pixel coordinates, three-dimensional coordinates, normalized coordinates). In some implementations, the TBLS 410 may, for example, store landmark data for thirty-three (33) anatomical landmarks of a user's body at each processed video frame. The anatomical landmarks may, for example, include head-related points (e.g., nose, left eye, right eye, left ear, right ear, mouth corners). The anatomical landmarks may, for example, include upper-extremity joints (e.g., left shoulder, right shoulder, left elbow, right elbow, left wrist, right wrist). The anatomical landmarks may, for example, include trunk and pelvic points (e.g., neck base, chest center, spine base, left hip, right hip). The anatomical landmarks may, for example, include lower-extremity joints (e.g., left knee, right knee, left ankle, right ankle, left heel, right heel, left toe, right toe). The TBLS 410 may, for example, store the body-landmark information in temporal order.

Using the TBLS 410, a biomechanical signature generation engine (BSGE 415) may generate biomechanical signature of the performance performed in the video data 205. For example, the BSGE 415 may determine joint-angle values between pairs of connected body landmarks for each sample video frame based on position coordinates stored in the TBLS 410. In some implementations, the BSGE 415 may identify maximum and minimum joint-angle values over a time window. For example, the BSGE 415 may compute range-of-motion values for selected joints. For example, the BSGE 415 may select one or more joint landmarks based on the exercise classification 270 of the video data 205. For example, the BSGE 415 may select joints for range-of-motion computation based on joint pairs listed in a joint-selection structure associated with a current exercise. For example, the BSGE 415 may select joints for range-of-motion computation based on the PBC 245 specifying the joints or joint groups.

In some implementations, the BSGE 415 may calculate velocity measurements by evaluating changes in landmark positions between successive frames over corresponding time intervals. For example, the BSGE 415 may compute distances between body landmarks to derive spatial relationships between body parts (e.g., limbs, torso). For example, the BSGE 415 may store aggregated statistics (e.g., of joint angles, ranges of motion, movement velocities, relative positioning values) derived from the TBLS 410. For example, the biomechanical signature data structure may provide data for movement patterns comparison across repetitions or across different performances.

As shown, an automatic classification engine (ACE 420) may generate a classification report 425 based on information retrieved from an exercise classification database 430. The exercise classification database 430 may, for example, store various exercise classification entries. For example, each exercise classification entry may associate with an exercise type identifier 435. For example, each exercise classification entry may include PBC 245. For example, each exercise classification entry may include modification indicators 445. The modification indicators 445 includes common variations by type ID 450 associated with the exercise type identifier 435.

As shown, the ACE 420 may, for example, receive a biomechanical signature generated by the BSGE 415. For example, the ACE 420 may compare the biomechanical signature with the PBC 245 of each of the exercise type ID 435. The ACE 420 may, for example, calculate similarity scores to quantify alignment between the biomechanical signature and respective PCB. The ACE 420 may, for example, identify a close-matching exercise classification entry that has a highest similarity score.

In some implementations, the ACE 420 may classify a performed exercise as a standard exercise type when the biomechanical signature falls within the PBC 245 associated with an exercise type identifier 435. In some implementations, ACE 420 may classify a performed exercise as a modified variation when the biomechanical signature falls outside PBC 245 for a standard exercise type but falls within predefined biomechanical criteria associated with the common variations by type ID 450 (e.g., standard push-ups vs knee supported push-ups).

The ACE 420 may, for example, receive a user-provided designation 460. For example, the ACE may determine whether the user-provided designation 460 differs from the close-matching exercise classification entry. The ACE 420 may, for example, reclassify the performed exercise from the user-provided designation 460 to the close-matching exercise classification entry based solely on the biomechanical signature comparison. The ACE 420 may, for example, store the classified exercise together with the close-matching exercise type identifier 435 for subsequent performance comparisons. ACE 420 may, for example, generate the classification report 425 that includes a close-matching type identifier 455, a differences indicator 465 describing differences between the user-provided designation 460 and the close-matching exercise type identifier 435, and a biomechanical-characteristics indicator 470 that identifies specific biomechanical characteristics of the biomechanical signature that triggered the reclassification.

As an illustrative example without limitation, a user may upload the video data 205 showing a sequence of sit-ups and may select "push-up" as the user-provided designation 460. ACE 420 may, for example, receive a biomechanical signature for the sequence from BSGE 415 and may compare the biomechanical signature with predefined biomechanical criteria (PBC 245) for a push-up entry and for a sit-up entry stored in the exercise classification database 430. The push-up entry may, for example, specify elbow flexion ranges, shoulder loading characteristics, and relative positioning values indicating arm support against the floor. The sit-up entry may, for example, specify hip and trunk flexion ranges, reduced upper-extremity loading, and relative positioning values indicating repeated changes in distance between chest landmarks and hip landmarks. ACE 420 may, for example, calculate similarity scores for the push-up entry and for the sit-up entry and may determine that the biomechanical signature aligns more closely with the sit-up entry than with the push-up entry. ACE 420 may, for example, select the sit-up entry as the close-matching exercise classification entry and may reclassify the performed exercise from the user-provided designation 460 of push-up to the exercise type identifier 435 corresponding to the sit-up entry. ACE 420 may, for example, generate the classification report 425 that identifies the sit-up entry as the close-matching type identifier 455, that presents in the differences indicator 465 a description of how hip and trunk flexion patterns differ from push-up criteria, and that records in the biomechanical-characteristics indicator 470 specific landmark trajectories and angle deviations that triggered the reclassification.

In various implementations, a bio-signature based exercise classification system may convert video into a temporal sequence of biomechanical signatures, and classifies the exercise by matching that signature against stored biomechanical criteria instead of trusting user-entered labels. For example, the bio-signature based exercise classification system may distinguish standard exercises from common variations and automatically reclassify mislabeled videos. Various implementations may advantageously reduce human errors in exercise classification.

In a conventional exercise classification system, exercise labels for recorded workouts may be provided by users, coaches, or gym staff, and a computer may store the labels together with video files or simple rep counts without performing detailed biomechanical analysis. In such systems, for example, a computer may function as a passive repository that retrieves user-entered exercise names and timestamps for display on dashboards or leaderboards. For example, mislabeling may occur when a user selects an incorrect exercise name from a menu or when a coach enters a shorthand label that does not match the movement actually performed in the video. For example, conventional systems may not distinguish between standard exercises and modified variations, which may reduce reliability of comparisons or training analytics that depend on the classification.

For example, the BSBECS 115 may use the PEE 405 and the BSGE 415 to generate biomechanical signatures from the video data 205. For example, ACE 420 may compare the biomechanical signature against the PBC 245 to select a close-matching exercise classification entry even when the user-provided designation 460 is incorrect. For example, ACE 420 may automatically reclassify a sit-up performance that was labeled as a push-up and may generate the classification report 425 identifying the close-matching type identifier 455. For example, this arrangement may provide a technical solution to a technical problem of enabling a computer system to perform exercise-type classification and reclassification based on biomechanical signatures derived from video data, rather than relying only on user-entered labels. For example, the BSBECS 115 may advantageously increase consistency of exercise classifications to improve accuracy of downstream performance evaluation systems.

Figure 5:
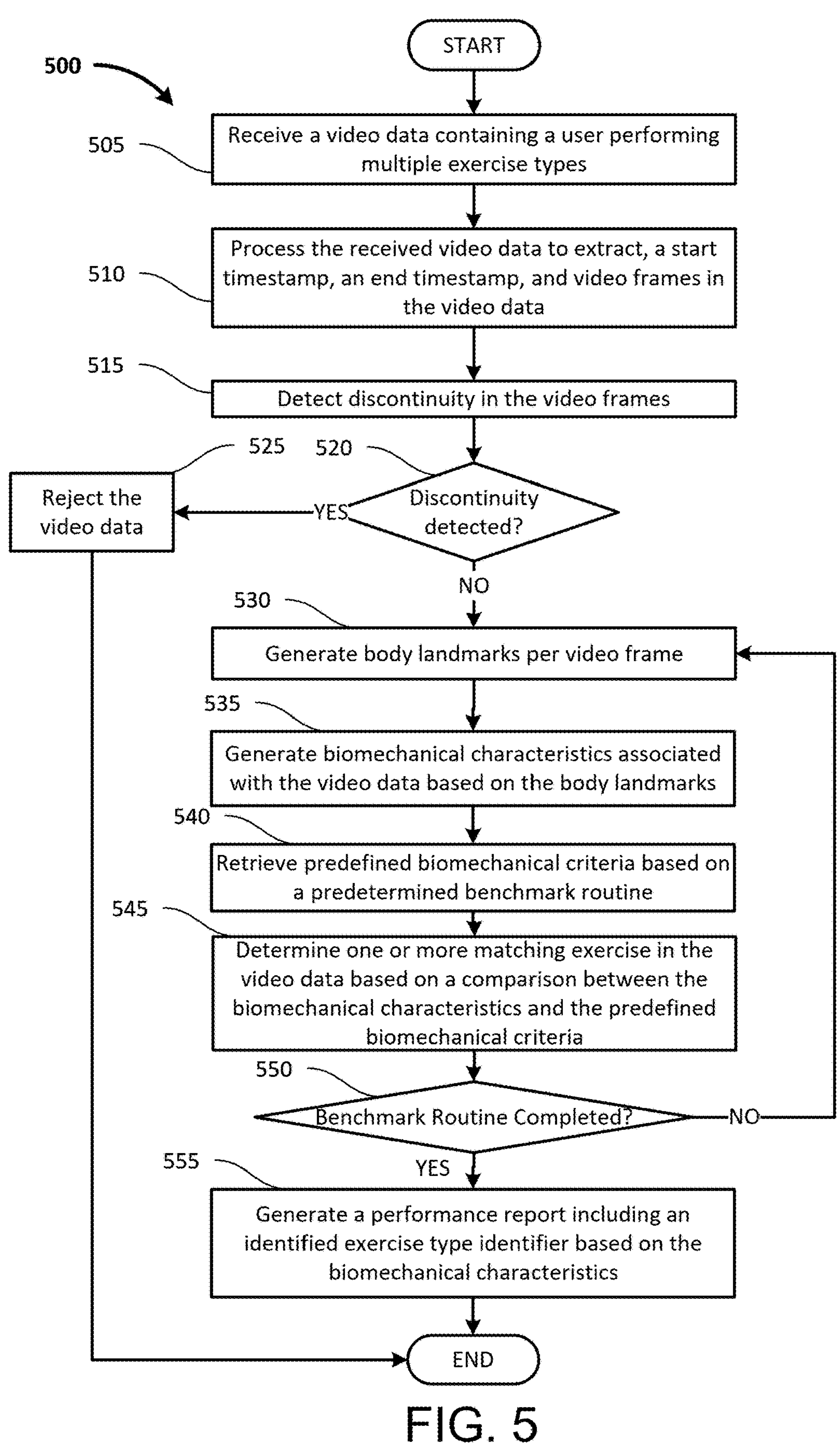
FIG. 5 is a flowchart to illustrate an exemplary temper proof performance evaluation method.

FIG. 5 is a flowchart to illustrate an exemplary temper proof performance evaluation method. For example, a method 500 may be performed by the TBPES 125 to generate an authenticated performance record. The method 500 begins in step 505 when a video data containing a user performing multiple exercise types is received. For example, the TBPES 125 may receive the video data 205.

In step 510, the received video data is processed to extract a start timestamp, an end timestamp, and individual video frames in the video data. For example, the TBPES 125 may parse container headers of the video data 205 to determine capture times, decode the video stream into sample frames, and record the earliest and latest frame timestamps as the start and end timestamps for the benchmark routine.

In step 515, discontinuity in the video frames is detected. For example, the DAE 210 may analyze information extracted from the video data 205 (e.g., frame indices, presentation timestamps, visual features, cryptographic metadata) to identify gaps, abnormal progressions, and/or editing artifacts that would indicate the video is not a single continuous recording.

At a decision point 520, it is determined whether a discontinuity has been detected in the video frames. For example, the DAE 210 may determine whether the recording satisfies continuity and authenticity thresholds. If a discontinuity is detected, in step 525, the video data is rejected, and the method 600 ends. For example, the TBPES 125 may generate a rejection signal to notify an external application that the submitted benchmark routine attempt is invalid.

If a discontinuity is not detected at the decision point 520, in step 530, body landmarks are generated for each video frame. For example, the BCEE 230 may apply a pose detection model to the validated video data 205 to identify, at each sample video frame, a plurality of body landmarks and associate each body landmark with corresponding two- or three-dimensional position coordinates.

In step 535, biomechanical characteristics associated with the video data are generated based on the body landmarks. For example, the BCEE 230 may compute joint angles between connected body landmarks, derive movement trajectories over time, and determine biomechanical characteristics such as ranges of motion, movement velocities, and relative spatial positioning between selected landmarks for the user performing the benchmark routine.

In step 540, predefined biomechanical criteria are retrieved based on a predetermined benchmark routine. For example, the ECCDE 235 may query the BRDB 240 from the IMAR 130 to retrieve the PBC 245 associated with the benchmark routines 275, including threshold values and completion requirements for each exercise in a sequence of exercises. In step 545, one or more matching exercises in the video data are determined based on a comparison between the biomechanical characteristics and the predefined biomechanical criteria. For example, the ECCDE 235 may compare parameterized biomechanical characteristics output by the BCEE 230 against biomechanical thresholds stored in the PBC 245, compute alignment scores for candidate exercises, and assign exercise classifications corresponding to entries in the benchmark routines 275 when the alignment scores exceed classification thresholds.

At a decision point 550, it is determined whether the benchmark routine has been completed. For example, the ECCDE 235 may monitor the time-ordered series of classified exercises, evaluate repetition counts and completion flags for each required exercise defined in the benchmark routines 275, and/or determine whether terminal completion conditions for the benchmark routine have been satisfied based on the biomechanical characteristics detected from the video data 205. For example, the ECCDE 235 may monitor a time-ordered series of classified exercises for the user. Advantageously, this may, for example, improve reliability of tracking an exercise sequence associated with a benchmark routine. The ECCDE 235 may evaluate repetition counts and completion flags for each required exercise defined in the benchmark routines 275. Advantageously, this may, for example, reduce misclassification of incomplete benchmark attempts as completed routines. The ECCDE 235 may determine whether terminal completion conditions specified for the benchmark routines 275 have been satisfied based on biomechanical characteristics detected from the video data 205. Advantageously, this may, for example, support generation of performance records that are comparable across different users and sessions.

If the benchmark routine has not been completed, the step 530 is repeated so that additional frames of the video data are processed to generate body landmarks and updated biomechanical characteristics for continued evaluation. If the benchmark routine has been completed at the decision point 550, in step 555, a performance report is generated including an identified exercise type identifier based on the biomechanical characteristics, and the method 500 ends. For example, the performance record generation engine 250 may generate the performance record 255 that includes the elapsed time value 260 derived from the start and end timestamps, the validation confirmation 265 indicating that the video data 205 satisfied continuity and authenticity requirements, and the exercise classification 270 identifying the exercises detected for the benchmark routines 275. In some examples, the performance record generation engine 250 may store the performance record 255 in the IMAR 130 for later retrieval by the AIAL 145 or an external application.

Figure 6:
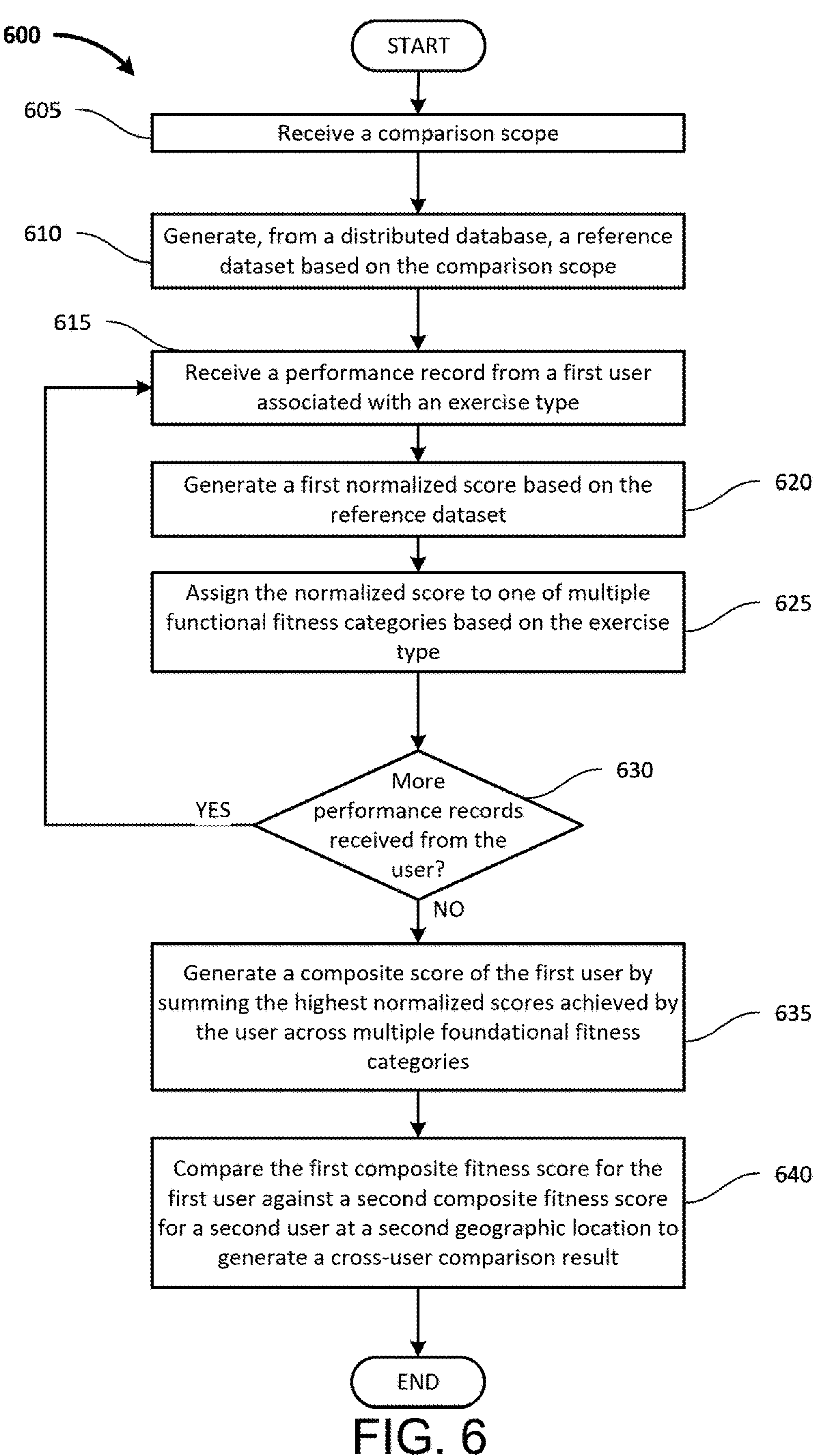
FIG. 6 is a flowchart to illustrate an exemplary cross-exercise geo-normalized scoring method.

FIG. 6 is a flowchart to illustrate an exemplary cross-exercise geo-normalized scoring method 600. For example, the CEGNSS 120 may perform the method 600. In this example, in step 605, the method 600 begins when a comparison scope is received to define a boundary for cross-user comparisons. For example, the RDGE 315 may receive a user-selected comparison scope 305 (e.g., local, regional, or global) from the AIAL 145 via a user device and may store the user-selected comparison scope 305 for later use in constructing a reference dataset.

In step 610, a reference dataset is generated from a distributed database based on the comparison scope. For example, the RDGE 315 may query a distributed performance records database 325 using geographic coordinates, demographic filters, and data-quality constraints derived from the user-selected comparison scope 305 to retrieve performance records 310 and may assemble the retrieved performance records into a reference dataset 320 representing benchmark performance for the selected scope.

In step 615, a performance record from a first user associated with an exercise type is received. For example, the CEGNSS 120 may receive a performance record 255 generated by the TBPES 125 or the BSBECS 115 for the first user, where the performance record 255 includes the exercise classification 270, the performance metric 350, and a user identifier.

In step 620, a first normalized score is generated based on the reference dataset. For example, the RGE 330 may determine a ranking or percentile position of the performance metric 350 for the first user relative to corresponding metric values in the reference dataset 320, and the NSGE 335 may transform the determined percentile into a normalized score on a common scale suitable for cross-exercise and cross-region comparison.

In step 625, the normalized score is assigned to one of multiple functional fitness categories based on the exercise type. For example, the NSGE 335 may use the exercise classification 270 to select a functional fitness category identifier from predefined fitness categories 355 (e.g., upper body strength, core strength, lower body strength, cardiovascular endurance, speed, balance, flexibility) and may store the normalized score for the first user in a score data store 360 indexed by the functional fitness category identifier and the user identifier.

At a decision point 630, it is determined whether more performance records have been received from the first user. For example, the CEGNSS 120 may check whether additional performance records 250 associated with the same user identifier are available for processing in other functional fitness categories. If more performance records are received from the first user, the step 615 is repeated so that each additional performance record 255 is normalized and stored in association with its corresponding functional fitness category.

If no more performance records are received from the first user at the decision point 630, in step 635, a composite score of the first user is generated by summing the highest normalized scores achieved by the user across multiple foundational fitness categories. For example, the CFFSGE 340 may, for each functional fitness category stored in the score data store 360 for the first user, identify a highest normalized score, combine the highest normalized scores across the categories according to composite-score computation logic, and generate a composite functional fitness score for the first user.

In step 640, the first composite fitness score for the first user is compared against a second composite fitness score for a second user at a second geographic location to generate a cross-user comparison result, and the method 600 ends. For example, the CFFSGE 340 may retrieve a composite functional fitness score for the second user from the score data store 360, compute a relative ranking or difference between the composite scores of the first user and the second user, and provide the cross-user comparison result to the AIAL 145 for presentation on a user interface as a leaderboard, percentile indicator, or summarized comparison report.

Figure 7:
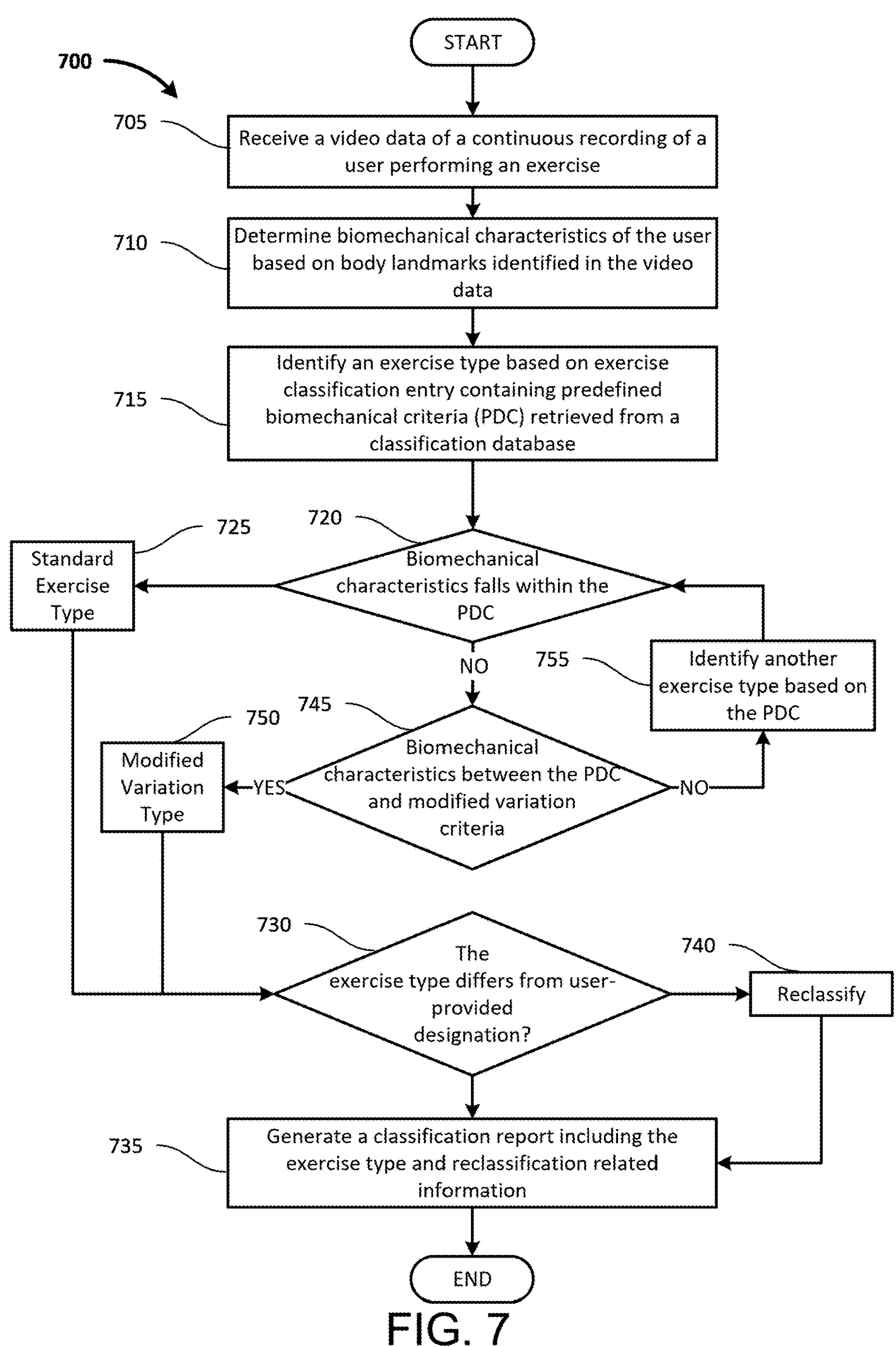
FIG. 7 is a flowchart to illustrate an exemplary bio-signature based exercise classification method.

FIG. 7 is a flowchart to illustrate an exemplary biosignature based exercise classification method 700. For example, the method 700 may be performed by the BSBECS 115. In this example, the method 700 begins in step 705 when a video data of a continuous recording of a user performing an exercise is received. For example, the BSBECS 115 may receive the video data 205 as a digitally encoded sequence of frames captured by a camera of a user device during a single exercise effort. Advantageously, this may, for example, support generation of exercise classifications that represent complete exercise performances.

In step 710, biomechanical characteristics of the user are determined based on body landmarks identified in the video data. For example, the PEE 405 may extract body landmarks for each sample video frame, and the BSGE 415 may compute joint angles, ranges of motion, and movement-velocity values from position coordinates stored in the TBLS 410. Advantageously, this may, for example, enable exercise classification to rely on measured movement patterns.

In step 715, an exercise type is identified based on an exercise classification entry that contains predefined biomechanical criteria retrieved from a classification database. For example, the ACE 420 may query the exercise classification database 430, may retrieve an exercise classification entry that includes PBC 245 and an exercise type identifier 435, and may select a candidate exercise type by comparing the biomechanical characteristics with the PBC 245. Advantageously, this may, for example, provide consistency when assigning exercise types across users.

At a decision point 720, it is determined whether the biomechanical characteristics fall within the predefined biomechanical criteria. For example, the ACE 420 may evaluate whether a biomechanical signature for the exercise lies within value ranges specified by the PBC 245 associated with the candidate exercise type identifier 435.

If the biomechanical characteristics fall within the predefined biomechanical criteria at the decision point 720, in step 725, the exercise is classified as a standard exercise type. For example, the ACE 420 may assign the exercise type identifier 435 from the matching exercise classification entry as a standard performance label for the video data 205. Advantageously, this may, for example, support tracking of reference-quality performances for benchmarking.

At a decision point 730, it is determined whether the exercise type differs from a user-provided designation. For example, the ACE 420 may compare the exercise type identifier 435 selected during classification with a user-provided designation 460 received as metadata together with the video data 205. Advantageously, this may, for example, identify mislabeling of uploaded recordings.

If the exercise type does not differ from the user-provided designation at the decision point 730, in step 735, a classification report is generated that includes the exercise type and reclassification related information. For example, the ACE 420 may generate the classification report 425 that includes the close-matching type identifier 455, a differences indicator 465, and a biomechanical-characteristics indicator 470, and may store the classification report 425 in association with the video data 205 or export the classification report 425 for use by the CEGNSS 120 or the TBPES 125. Advantageously, this may, for example, provide an auditable explanation of the classification.

If the exercise type differs from the user-provided designation at the decision point 730, in step 740, the performed exercise is reclassified. For example, the ACE 420 may replace the user-provided designation 460 with the close-matching exercise type identifier 435 based on biomechanical signature comparison and may record indicators describing that a reclassification occurred. Advantageously, this may, for example, improve quality of stored exercise labels used for analytics and benchmark generation. After completion of step 740, the step 735 is repeated so that a classification report is generated for the reclassified exercise type.

If the biomechanical characteristics do not fall within the predefined biomechanical criteria at the decision point 720, at a decision point 745, it is determined whether the biomechanical characteristics satisfy modified variation criteria between the predefined biomechanical criteria and a set of modified variation criteria. For example, the ACE 420 may compare the biomechanical signature with biomechanical criteria associated with common variations by type ID 450 stored in the exercise classification entry and may determine whether the biomechanical signature lies within value ranges specified for a modified variation. Advantageously, this may, for example, enable recognition of controlled modifications of predefined standard exercises.

If the biomechanical characteristics satisfy the modified variation criteria at the decision point 745, in step 750, the exercise is classified as a modified variation type. For example, the ACE 420 may assign an identifier corresponding to one of the common variations by type ID 450 as the exercise type for the video data 205. Advantageously, the ACE 420 may, for example, allow reporting that distinguishes reference performances from modified variations of the same exercise. After completion of step 750, the decision point 730 is reached so that agreement with a user-provided designation is evaluated.

If the biomechanical characteristics do not satisfy the modified variation criteria at the decision point 745, in step 755, an exercise type is identified based on predefined biomechanical criteria for a different exercise classification entry, and the step 715 is repeated. For example, the ACE 420 may select a different exercise classification entry from the exercise classification database 430, may retrieve the associated PBC 245, and may perform a new comparison between the biomechanical characteristics and the newly selected PBC 245. Advantageously, the BSBECS 115 may, for example, automatically correct a user-designated classification across multiple exercise types without manual relabeling.

FIGS. 8A, 8B, 8C, 8D, 8E, 8F, 8G, 8H, 8I, and 8J show exemplary data structures of a GMIS. As shown in FIG. 8A, a video_asset 805 includes a video_id. For example, the video_id may uniquely identify a captured video associated with a movement session. The video_asset 805 includes a person_id. For example, the person_id may reference an anonymized internal identifier of the subject in the video.

In this example, the video_asset 805 includes a capture_device. For example, the capture_device may include a device_id, a make, a model, and a firmware field describing the recording device. As shown, the video_asset 805 includes a capture profile. For example, the capture_profile may include fps, resolution, codec, and an audio flag.

In the depicted example, the video_asset 805 includes timestamps. For example, the timestamps may include a start time, an end time, and an elapsed_s field indicating total session duration. The video_asset 805 includes a metadata_chain. For example, the metadata_chain may include entries with t, hash, and prev values. The metadata_chain generates immutable continuity information based on the t, hash, and prev fields.

As shown, the video_asset 805 includes a geo field. For example, the geo field may include lat, lon, and region information for geographic contextualization.

The video_asset 805 further includes quality_indicators, which may include a frame_continuity_score, a resolution_ok flag, and a timestamp_monotonic flag.

The video_asset 805 also includes consent ids and tags representing provenance and consent lineage, as well as a version field. As an illustrative example without limitation, the video_asset 805 may advantageously provide a cryptographically verifiable, high-quality source structure for downstream pose estimation, classification, and benchmarking operations.

As shown in FIG. 8B, a session_validation 810 includes a validation_id. For example, the validation_id may identify a specific validation workflow for a captured movement session. The session_validation 810 includes a video_id. For example, the video_id may link the validation record to the underlying video_asset 805.

In this example, the session_validation 810 includes checks. For example, the checks may include cryptographic_consistency, frame_continuity, and timestamp_integrity. The cryptographic_consistency field may include a method and a result. The frame_continuity field may include breaks_detected and score. The timestamp_integrity field may include monotonic and gaps. The checks generate validation outcomes based on the cryptographic_consistency, the frame_continuity, and the timestamp_integrity.

The session_validation 810 includes a validated_continuous_stream flag indicating whether the session meets single-stream requirements. The session_validation 810 also includes an elapsed_s duration field and an audit object. For example, the audit may include a no_human_input flag and a generated_at timestamp. As an illustrative example without limitation, the session_validation 810 may advantageously confirm video integrity and continuity before biomechanical processing or benchmarking operations.

As shown in FIG. 8C, a pose_trace 815 includes a data_id. For example, the data_id may reference a specific pose-extraction output generated from processing a video. The pose_trace 815 includes a video_id and a person_id associated with the pose data. In this example, the pose_trace 815 includes a model. For example, the model may include a skeleton definition and a sampling_hz value describing frame sampling frequency.

As shown, the pose_trace 815 includes frames. For example, the frames may include a t timestamp and landmarks storing position coordinates of anatomical points. In the depicted example, the pose_trace 815 includes biomech. For example, the biomech may include angles_deg, trajectories, velocity, and rom fields representing derived biomechanical metrics. The biomech generates structured biomechanical signatures based on the angles_deg, the trajectories, the velocity, and the rom.

The pose_trace 815 further includes consent_ids, tags, and a version to support integrity and lineage tracking. As an illustrative example without limitation, the pose_trace 815 may advantageously provide a synchronized, multivariate biomechanical record enabling accurate exercise classification and performance scoring.

As shown in FIG. 8D, the classification_entry 820 includes an entry_id. For example, the entry_id may reference a predefined biomechanical definition for a particular exercise. The classification_entry 820 includes an exercise_type_id, a functional_category, and predefined_biomech_criteria, which may include angles_required, velocity_windows, and positional_constraints fields. The classification_entry 820 also includes modification_indicators, rule_sets, and a version value describing the criteria version.

As shown, the classification_result includes a classification_id, an input_data_id, and a person_id. For example, the classification_id may identify the outcome of classifying a biomechanical sequence. The classification_result further includes a best_match_entry_id, a confidence score, a standard_or_modified indicator, and a reason_code. The classification_result includes similarity_scores and user_label_override fields, as well as a version.

The classification_result includes a best_match_entry_id, a similarity_scores, and a predefined_biomech_criteria. As an illustrative example without limitation, the classification_entry 820 and accompanying classification_result may advantageously enable an unbiased, pose-driven identification of exercise type without relying on manually provided labels.

As shown in FIG. 8E, the performance_record 825 includes a record_id. For example, the record_id may uniquely identify a validated benchmark performance. The performance_record 825 includes a person_id, a video_id, a validation_id, and a data_id linking pose, validation, and video data. The performance_record 825 includes an exercise_type_id, a benchmark_regimen_id, and an elapsed_s duration.

The performance_record 825 includes a validated_continuous_stream flag indicating single-session compliance. In this example, the performance record 825 includes a biomech_summary. For example, the biomech_summary may include rom_keys, velocity_keys, and positional_keys, each referencing selected biomechanical metrics.

As shown, the performance_record 825 includes quality_flags. For example, the quality_flags may include frame_continuity_ok, timestamp_auth_ok, and resolution_ok fields. The performance_record 825 includes a geo field including lat, lon, and region values. The performance_record 825 includes consent_ids, tags, a created_at timestamp, and a version. The performance_record 825 includes a biomech_summary, a quality_flags, and a validated_continuous_stream flag.

As an illustrative example without limitation, the performance_record 825 may advantageously consolidate validated biomechanical, geographic, and quality information into a single structure for benchmarking and scoring.

As shown in FIG. 8F, the benchmark_regimen 830 includes a regimen_id. For example, the regimen_id may reference a specific benchmark routine defined within the GMIS. The benchmark_regimen 830 includes a title that may, for example, store a human-readable name of the routine.

In this example, the benchmark_regimen 830 includes requirements. For example, the requirements may include a single_session indicator, a min_duration_s value, and required_exercises listing exercise identifiers expected within the session.

As shown, the benchmark_regimen 830 includes a validation_policy. The validation_policy may, for example, indicate expected validation conditions such as require_frame_continuity and require_hash_chain.

The benchmark_regimen 830 includes bonus_rules. The bonus_rules may, for example, represent optional scoring or reward logic associated with completing the regimen, and a version indicating the revision of the regimen definition.

As an illustrative example without limitation, the benchmark_regimen 830 may represent structured benchmark requirements that external components may use to validate whether a performance satisfies predetermined single-session and quality thresholds.

As shown in FIG. 8G, the scoring_profile 835 includes a profile_id. For example, the profile_id may store an identifier referencing a specific scoring configuration. The scoring_profile 835 includes functional_categories, which may, for example, list movement or fitness groupings used during scoring.

In the depicted example, the scoring profile 835 includes weights, a normalization_method, a percentile_recompute_policy, and quality_filters, each representing stored parameters that downstream scoring engines may reference when computing percentile, normalized, or composite values. The scoring profile 835 also includes a version representing the configuration revision.

In this example, a normalized_score structure includes a score_id, a record_id, a person_id, an exercise_type_id, a functional_category, a reference_scope, a reference_dataset_id, a ranking, a population, a percentile, a normalized_value, a method, and a version. These fields may, for example, store statistics and values derived by a scoring engine when processing a performance_record.

As shown, a composite_fitness structure includes a composite_id, a person_id, a profile_id, and components, which may, for example, store per-category values that contribute to a cumulative fitness representation.

As an illustrative example without limitation, the scoring_profile 835 may represent the scoring ruleset and associated weighting parameters that other system components may reference to compute ranking, percentile, and composite values.

As shown in FIG. 8H, the public_attribute profile includes a public_id and a record_id. For example, the public_id may store an anonymized identifier used for public-facing representations. The public_attribute_profile includes demographics, geographic_context, and data_quality, each of which may, for example, store descriptive metadata associated with a public performance view. The public_attribute_profile includes an immutable_hash, a created_at timestamp, and a version, which may, for example, represent integrity assurance and revision tracking.

In the depicted example, the private_attribute_profile includes a private_id, a record_id, ownership_lineage, consent_terms, and access_permissions. These fields may, for example, store information regarding ownership, provenance, and access authorization that is not exposed in public contexts. The private_attribute_profile includes an immutable_hash, a created_at timestamp, and a version.

As shown, the linkage identifier includes a uid, binds, everything_tags, a revocation_policy, and a version. These fields may, for example, associate the public attributes, private attributes, and underlying raw record under a single unified linkage while preserving revocation and consent propagation rules.

As an illustrative example without limitation, the structures shown in FIG. 8H may represent a layered attribute model separating public metadata from private ownership and consent information while maintaining integrity through immutable hashes and linkage identifiers.

As shown in FIG. 8I, the consent profile 840 includes a consent_id. For example, the consent_id may reference an individual consent artifact stored within the GMIS. The consent_profile 840 includes a subject_person_id, scope, purposes, and regions_allowed, which may, for example, store limits on how associated data may be processed or distributed.

In this example, the consent_profile 840 includes an expires_at value and provenance information. The provenance may, for example, include a source, a timestamp, and a verifier field indicating how the consent was captured.

As shown, the consent_profile 840 includes an immutable_hash and a version, which may represent a tamper-evident record of the consent artifact and its revision state.

As an illustrative example without limitation, the consent profile 840 may represent the granular consent configuration that external systems reference to enforce that data usage complies with user-specified purpose, region, and access limitations.

As shown in FIG. 8J, the marketplace_object 845 includes a mo_id and a linkage_uid. For example, the mo_id may refer to a listing of a data asset within a marketplace environment, while the linkage_uid may associate the listing with its underlying lineage.

The marketplace_object 845 includes an export_policy, which may, for example, include identity, allowed_fields, and blocked_fields. These fields may store policy constraints that determine which attributes can be included when packaging an anonymized dataset for distribution.

In this example, the marketplace_object 845 includes a dataset_descriptor. For example, the dataset_descriptor may include a title, size_records, a skeleton, and a profile, which may store descriptive metadata for potential buyers or downstream processors.

As shown, the marketplace_object 845 includes compliance, which may include consent_verified and a policy_ref indicating adherence to policy frameworks. The marketplace_object 845 includes a version identifying the revision of the marketplace listing.

As an illustrative example without limitation, the marketplace_object 845 may represent a configurable, policy-restricted dataset listing that a marketplace engine may use when preparing anonymized biomechanical datasets for distribution or licensing.

Although various embodiments have been described with reference to the figures, other embodiments are possible. For example, some embodiments may automatically generate a structured naming identifier for each performance record or dataset. The identifier may encode geographic region codes, facility codes, exercise-type identifiers, method indicators (video/consent/context), quality-tier indicators, contributor identifiers, and version information. The naming identifier may be machine-readable such that downstream systems can determine, from the identifier alone, metadata such as geographic origin, exercise category, data-quality tier, consent lineage, or version number without retrieving the underlying dataset. This enables indexing, filtering, and dataset selection using only identifier parsing.

For example, some embodiments may further incorporate an identifier-parsing module configured to extract metadata attributes directly from the structured naming identifier. The module may enable dataset-level filtering, sorting, marketplace-listing selection, and cross-region scope matching without requiring access to the underlying video, biomechanical signature, or attribute profiles. This identifier-level inference mechanism allows large-scale dataset navigation and marketplace operations to be performed using lightweight string-based filtering rather than expensive database queries or video decoding operations.

For example, some embodiments may implement a Global Movement Intelligence Platform (GMIP) that provides an inclusive, video-verified, cross-geographic movement dataset for AI model training with structured demographic and contextual information (e.g., age, gender, geography, consent, and recording context). Some embodiments may provide an Everything Tag (ET) provenance layer that links physical-world consent and contextual data to digital datasets so that each movement record or physical object is associated with provenance, consent, and ownership lineage. Some embodiments may define a minimum upload specification that standardizes metadata for human-movement video, including consent and health context, in a manner similar to existing formats for photos or medical imaging. Some embodiments may implement an adaptive data-completion loop in which AI-driven logic prioritizes and requests the most valuable missing data from contributors to improve model performance. Some embodiments may define a Global Human Performance Index (GHPI) that integrates functional-fitness performance and demographic or contextual information into a standardized movement-based score. Some embodiments may provide an inclusive data-licensing marketplace in which communities are able to license anonymized, video-verified movement data for AI training with benefit-sharing or community participation mechanisms. Some embodiments may integrate local champion or local record features so that human-verified local performances are ingested into a global data model and used to refresh the movement knowledge base. Some embodiments may support cross-domain learning in which emotional, social, and economic context is treated as an additional model-training signal alongside physical movement. Some embodiments may be deployed through community-based or nonprofit organizations that act as ethical data-collection entities for movement and contextual data. Some embodiments may further integrate a Groom Data Stack (GDS) or similar architecture that links physical movement, emotional state, worldview information, and transactional behavior under a unified AI learning framework.

Although an exemplary system has been described with reference to the figures, other implementations may be deployed in other industrial, scientific, medical, commercial, and/or residential applications.

Some embodiments may include implementations such as disclosed at least with reference to FIGS. 1-17 of U.S. patent application Ser. No. 16/947,455, entitled "Multi-Dimensional Interaction with Data Stores Related to Tangible Property," filed Aug. 3, 2020, the entire contents of which are incorporated herein by reference. For example, the Global Movement Intelligence Platform may implement a representative map (RM) architecture where exercise performance data, physical objects (such as fitness equipment), and environmental contexts (such as gym locations or outdoor training environments) are represented as representative objects (ROs) within a unified spatial interface. Each exercise performance record may be assigned a unique identifier analogous to the unique identifiers described in the '455 application, enabling the system to query multiple application programming interfaces (APIs) to retrieve related information across different knowledge domains. When a user selects a representative object corresponding to an exercise performance, the system may retrieve and display linked information from multiple data stores, including video recordings from the movement intelligence subsystem, equipment specifications from the media discovery subsystem, and location-specific environmental data. The API selection and querying mechanisms described in the '455 application may be adapted to enable the cross-domain relationship detection algorithm to identify semantic connections between movement performances, physical training equipment, and environmental conditions based on shared attributes such as geographic location, temporal proximity, and/or participant identity.

Some embodiments may include implementations such as disclosed at least with reference to FIGS. 4-8 of U.S. patent application Ser. No. 16/947,455, entitled "Multi-Dimensional Interaction with Data Stores Related to Tangible Property," filed Aug. 3, 2020, the entire contents of which are incorporated herein by reference. For example, the dual-layer dataset architecture of the Global Movement Intelligence Platform may implement representative objects (ROs) for both benchmark exercise routines (GFF dataset) and individual exercise performances (local records dataset), with each RO containing a unique identifier that enables linking across multiple data stores. When a user performs a benchmark routine, the system may generate a representative object in a three-dimensional visualization interface showing the user's performance location, with the RO linked to video recordings, biomechanical analysis data, consent records, and demographic metadata stored across distributed databases. The system may implement the API querying mechanisms described in the '455 application to automatically retrieve additional information related to each exercise performance, such as equipment specifications from manufacturer databases, environmental conditions from weather APIs, or comparative performance data from fitness tracking platforms. Users may interact with representative objects in a map-based interface to explore exercise performances by geographic region, with the system displaying linked information including performance rankings, video recordings, and AI-generated fitness predictions when a user selects a particular RO. The unique identifier system may enable marketplace transactions where data buyers can reference specific exercise datasets using persistent identifiers, with the system retrieving complete provenance records and quality metrics through the linked data architecture.

Some embodiments may include implementations such as disclosed at least with reference to FIGS. 1-13 of U.S. patent application Ser. No. 14/302,401, entitled "System and Method for Searching, Organizing, Exploring and Relating Online Content," filed Jun. 11, 2014, the entire contents of which are incorporated herein by reference. For example, the Global Movement Intelligence Platform may implement content organization and curation mechanisms similar to those described in the '401 application to enable users to save, organize, and explore exercise performance data and related fitness content. Users may create curated collections of exercise videos, benchmark routines, and training programs, with the system automatically identifying and suggesting related content based on saved items. The platform may implement a search and discovery interface that allows users to explore exercise performances based on biomechanical similarity, demographic characteristics, or performance metrics, analogous to the content exploration features described in the '401 application. The system may generate recommendations for new exercises or training routines based on a user's saved content and performance history, utilizing the relationship identification mechanisms described in the '401 application to connect users with relevant fitness content across the platform's multi-domain dataset architecture.

Some embodiments may include implementations such as disclosed at least with reference to FIGS. 1-19 of U.S. patent application Ser. No. 15/912,199, entitled "System and Method for Searching for Media Related Content," filed Mar. 5, 2018, the entire contents of which are incorporated herein by reference. For example, the Global Movement Intelligence Platform may implement an intelligent API selection mechanism similar to that described in the '199 application to adapt retrieval of exercise-related data from multiple remote content providers. When generating a comprehensive dataset for a particular exercise or user, the system may automatically select among available APIs based on factors including: (i) cost to use the APIs for accessing fitness databases, video repositories, or sensor data streams; (ii) download speeds associated with retrieving large video files or real-time sensor data; (iii) resource limits such as rate limiting or caching constraints imposed by third-party fitness platforms; (iv) amount and quality of exercise data available through each API; and/or (v) the number of APIs to obtain complete metadata, consent records, and/or performance metrics. The system may prioritize higher-cost APIs when they provide target biomechanical data and/or verified performance records that lower-cost alternatives cannot supply. The platform may implement caching mechanisms, such as to retrieve previously accessed exercise summaries, performance statistics, and/or related content from memory when API calls were made within a specified time window, thereby reducing redundant queries and improving system performance. The API selection logic may be integrated with the cross-domain relationship detection algorithm to efficiently gather linked data across the movement intelligence, provenance tracking, and media discovery subsystems while adapting for cost, speed, and/or data completeness.

Some embodiments may include implementations such as disclosed at least with reference to FIGS. 10-15 of U.S. patent application Ser. No. 15/912,199, entitled "System and Method for Searching for Media Related Content," filed Mar. 5, 2018, the entire contents of which are incorporated herein by reference. For example, the Global Movement Intelligence Platform may implement dynamic content updating mechanisms that automatically retrieve new and updated exercise performance data, benchmark scores, and related fitness content from multiple remote providers using intelligently selected APIs. When a user accesses their performance dashboard, the system may identify new exercise submissions, updated leaderboard rankings, or recently published training content since the user's last session, highlighting this new content based on the user's IP address or login credentials as described in the '199 application. The platform may display at least one piece of target information (such as the user's current global ranking) very quickly while continuing to download additional content such as detailed performance analytics, video recordings, or AI-generated fitness predictions in the background. The system may identify and display the most recent piece of content acquired via each API utilized, enabling users to see the latest benchmark performances from the movement intelligence subsystem, the most recent equipment reviews from the media discovery subsystem, and updated consent status from the provenance tracking subsystem. The intelligent API selection mechanism may balance comprehensive data retrieval against cost and performance constraints. For example, the mechanism may prefer higher numbers of APIs when they provide diverse data sources that enhance the platform's cross-contextual learning capabilities, while implementing caching strategies to avoid redundant queries for frequently accessed exercise data or user profiles.

In various embodiments, an AI-ready multi-domain dataset generation system may advantageously address fundamental technical challenges in computer systems that process heterogeneous data types, such as for machine learning applications. Conventional computer systems may store disparate data types-video files, sensor data streams, physical object metadata, and contextual information-in isolated databases with incompatible data structures and/or query interfaces. This architectural restriction may, for example, prevent computer systems from efficiently retrieving related information across data domains, requiring computationally expensive sequential queries to multiple databases, often followed by manual correlation of results. The technical problem may be particularly acute in machine learning contexts where training datasets incorporate multi-modal information: a computer system may, for example, be unable to identify which video recordings, sensor measurements, and/or physical object specifications are semantically related without explicit human annotation.

The disclosed system provides a technical solution through a unified dataset index architecture that fundamentally changes how computer systems organize and retrieve heterogeneous data. The unified dataset index may, for example, advantageously maintain bidirectional linkages between performance records, physical object identifiers, and/or metadata entries using a unique identifier system. This data structure enables the computer system to perform indexed lookups rather than exhaustive searches. Accordingly, various embodiments may advantageously reduce query complexity from $O(n^2)$ for pairwise comparisons to $O(1)$ for indexed retrieval operations. When a computer system receives a query for information related to a particular performance record, the unified index may, for example, advantageously enable direct retrieval of (e.g., all) linked data across subsystems through pre-established relationships, which may advantageously reduce or eliminate sequential database queries and/or manual result correlation.

The system may, for example, incorporate computer vision processing modules that automatically extract structured information from unstructured video data. A pose estimation engine processes video frames to detect anatomical landmarks in three-dimensional space, generating temporal sequences of body positions represented as numerical coordinate arrays. This transformation may, for example, converts unstructured video content into structured numerical representations suitable for machine learning algorithms. An object recognition module applies computer vision algorithms to identify physical objects within video frames and computes spatial relationships between detected objects and human subjects. The spatial analysis may, for example, determine relative positioning, orientation, and/or distance measurements that characterize the environmental context of recorded performances. These computer vision operations enable automatic contextual enrichment of dataset records without requiring manual annotation, addressing the technical problem of dataset completeness at scale.

In various embodiments, a cross-domain relationship detection algorithm may, for example, implement multi-attribute similarity scoring. The scoring may, for example, automatically identify semantic connections between data objects. The algorithm may, for example, extract attribute vectors from each data object spanning temporal, spatial, participant identity, and/or contextual dimensions. For temporal proximity analysis, the algorithm may, for example, process timestamp metadata, such as to identify events occurring within configurable time windows. Such embodiments may advantageously distinguish between coincidental temporal overlap and causally related events, such as through statistical correlation analysis. The spatial co-location detection component may, for example, process geographic coordinates and/or video-based spatial positioning data, such as to identify physical objects present during performance recordings. The component may generate, for example, confidence scores, such as for object-performance associations based on visual evidence extracted from video frames. The participant identity linking component may, for example, maintain anonymized identifiers across multiple data collection sessions (e.g., using cryptographic techniques). Participant linking may, for example, advantageously enable longitudinal analysis while preserving privacy. This automated/algorithmic approach may, for example, advantageously discover non-obvious connections-such as linking a movement performance to equipment specifications based on spatial co-occurrence detected in video frames-that may otherwise rely on extensive manual review in conventional systems.

The system may, for example, implement automated provenance chain generation, such as with cryptographic integrity verification. Data objects (e.g., each data object) may, for example, receive cryptographic signatures that establish an immutable record of data origin, ownership, consent status, and modification history. The provenance tracking subsystem may, for example, automatically generate compliance labels based on jurisdiction-aware rules, which may enable the computer system to programmatically verify data usage rights and/or generate compliance reports for AI training datasets. This technical capability may, for example, address the computational infeasibility of manually tracking consent and/or regulatory compliance across millions of records spanning multiple legal jurisdictions.

The unified dataset index architecture provides measurable improvements to computer system performance. Query operations that previously consumed seconds for sequential full-table scans across multiple databases may, for example, complete in milliseconds using indexed parallel queries. The system may, for example, advantageously enable automated data completeness verification, which may advantageously enable the computer system to programmatically determine which mandatory metadata fields are missing for a given record and automatically prioritize data collection efforts based on computed AI training value. The indexed architecture may, for example, support real-time aggregation across millions of records spanning multiple domains, which may enable analytics queries that simultaneously span movement data, physical objects, and/or contextual meta-data-operations that would be computationally prohibitive or even impossible with unstructured data organizations.

The technical improvements provided by the unified dataset index architecture improve computer technology, model training technology, and movement data structure technology. In some embodiments, the system changes how computer systems organize data in memory and storage, implementing a novel data structure that enables efficient cross-domain queries. In some embodiments, the pose estimation and object recognition modules improve computer vision processing, such as by generating structured outputs specifically designed for machine learning consumption. In some embodiments, the cross-domain relationship detection algorithm implements new and computer-specific computational process for identifying semantic connections that augment or replace manual review processes impossible at real-life scale and speed. These technical features represent improvements to computer functionality rather than abstract ideas or conventional data gathering activities.

In various embodiments, the cross-domain inference and connection platform may, for example, address technical challenges in distributed computing systems that coordinate data retrieval and processing across multiple remote services. Modern software architectures increasingly rely on specialized subsystems accessed through application programming interfaces (APIs) and/or Model Context Protocols (MCPs), but conventional integration approaches rely on manual coordination of authentication, rate limiting, response format translation, and/or error handling for each API interaction. This may, for example, create computational inefficiency and architectural complexity when a single logical operation relies on data from multiple subsystems. The technical problem is compounded when training machine learning models on multi-modal data: conventional approaches train separate models on each data modality and manually integrate their outputs, preventing the models from learning cross-domain correlations directly.

In some embodiments, the disclosed platform may, for example, implement an intelligent API orchestration mechanism that adjusts subsystem selection based on quantitative performance characteristics. The orchestration logic may, for example, maintain a performance profile for each available API including response time distributions, cost per query, data completeness metrics, and/or current rate limit status. When the platform receives a data retrieval request, the orchestration module may, for example, evaluate these characteristics and select a combination of APIs that are computed to satisfy the request while reducing latency and cost. For requests requiring data from multiple subsystems, the orchestration mechanism may, for example, execute API calls in parallel where dependencies permit, implementing automatic retry logic with exponential backoff for transient failures. This technical approach may, for example, reduce the computational overhead of multi-subsystem coordination from manual sequential operations to automated parallel execution with intelligent error recovery.

The platform may, for example, implement event-driven update propagation, which may advantageously maintain consistency across distributed systems. When one subsystem updates a record, the platform may, for example, automatically propagate changes to linked records in other subsystems through a message queue architecture. The propagation mechanism may, for example, include conflict resolution logic. The logic may, for example, analyze timestamp metadata, such as to determine authoritative version(s) when concurrent updates occur. Various embodiments may, for example, advantageously provide a technical solution addressing distributed systems' challenge of maintaining consistency without requiring expensive distributed transactions and/or multi-phase commit protocols. Event-driven architecture, for example, may advantageously decouple write operations from synchronization overhead, which may advantageously enable high-throughput data ingestion while facilitating eventual consistency across subsystems.

The query translation engine may, for example, implement an abstract query interface that translates high-level data retrieval requests into subsystem-specific query languages. The translation engine may, for example, maintain a semantic mapping between the platform's unified data model and each subsystem's schema, which may automatically generate appropriate field names, filter predicates, and/or join operations for each target subsystem. This technical capability may, for example, reduce or eliminate application code to understand the specific query syntax and data schema of each subsystem, which may advantageously provide a stable interface that insulates applications from subsystem implementation changes. The query translation process may, for example, include adjustment logic that pushes filtering operations to subsystems where possible, which may advantageously reduce data transfer volumes and/or improve query performance.

The platform may, for example, advantageously enable machine learning model training on synchronized multi-modal data streams, such as through specialized data loader implementations. The multi-stream data loaders may, for example, retrieve temporally aligned data from movement intelligence, provenance tracking, and/or media discovery subsystems. This may advantageously facilitate training batches containing complete cross-domain context for each example. The temporal alignment process may, for example, account for clock skew between subsystems and/or interpolate missing data points, such as, for example, maintaining consistent sampling rates. Various embodiments may advantageously provide a technical approach that reduces or eliminates temporal misalignment artifacts that degrade model performance in conventional multi-modal training pipelines. The synchronized data streams may, for example, advantageously enable neural network architectures to learn cross-modal attention mechanisms, such as where the model automatically discovers which contextual attributes from different subsystems improve prediction accuracy.

In some embodiments, the platform may include, for example, provenance-aware training pipelines. The training pipelines may, for example, query the provenance tracking subsystem to retrieve usage constraints for each data record. The pipelines may, for example, exclude data that violates consent terms or regulatory mandates. For example, this approach may facilitate training AI models on legally compliant data. For example, this approach may reduce manual filtering steps. For example, this approach may reduce separate compliance verification steps. In some embodiments, the provenance-aware filtering may operate at the data loader level. For example, the filtering may reduce non-compliant data from entering GPU memory or training computation graphs.

In some embodiments, the Model Context Protocol integration may include, for example, a standardized interface. The interface may, for example, allow large language models and other AI systems to query the platform's multi-domain datasets programmatically. In some embodiments, the MCP endpoints may expose, for example, structured data retrieval functions. AI models may, for example, invoke the functions through function calling mechanisms. In some embodiments, the MCP interface may include, for example, automatic query planning. The query planning may, for example, translate natural language requests into database queries. The query planning may, for example, execute multi-hop reasoning across subsystems. The query planning may, for example, format results in structures suitable for AI model consumption. For example, this approach may allow external AI systems to perform complex reasoning over the platform's linked datasets. For example, this approach may reduce direct database access. For example, this approach may reduce reliance on knowledge of the underlying data schemas.

In some embodiments, the cross-domain inference platform may include, for example, technical features related to distributed computing systems. In some embodiments, the intelligent API orchestration mechanism may include, for example, parallel execution and subsystem selection. For example, the mechanism may reduce query latency. In some embodiments, the event-driven update propagation may include, for example, a technical solution to the distributed consistency problem. For example, the solution may reduce overhead of distributed transactions. In some embodiments, the query translation engine may include, for example, an abstraction layer. The abstraction layer may, for example, decouple application logic from subsystem implementation details. For example, the decoupling may increase system maintainability. In some embodiments, the synchronized multi-modal data loaders may include, for example, a machine learning training approach. For example, the approach may differ from conventional single-modality training pipelines. These technical features may relate to computer system architecture and distributed computing functionality.

In some embodiments, the actual-performance classification system may address, for example, technical problems in computer vision systems that analyze human movement from video recordings. Conventional video analysis systems may rely on user-provided labels to categorize exercise performances. This approach may include, for example, label inconsistency, language barriers, and intentional mislabeling. The technical challenge may include, for example, developing computer vision algorithms that can automatically classify exercise performances based on measured biomechanical characteristics, independent of user input. In some embodiments, the system may include, for example, video authenticity verification. For example, the verification may reduce fraudulent submissions created through video editing. In some embodiments, the verification may include, for example, technical mechanisms to detect frame manipulation, temporal discontinuities, and content splicing.

In some embodiments, this biomechanical pattern matching approach may include, for example, several technical advantages over conventional classification methods. The algorithm may achieve, for example, increased classification accuracy compared to rule-based systems. The approach may include, for example, improvements in detecting modified exercise variations (e.g., increased accuracy over user-label-based approaches). In some embodiments, the classification may operate independently of user-provided labels. For example, this may reduce errors from label inconsistency, language barriers, and/or intentional mislabeling. In some embodiments, the system may distinguish, for example, over 250 biomechanically distinct exercise types.

In some embodiments, actual-performance classification system may include, for example, technical features related to computer vision and video processing technology. In some embodiments, the multi-point pose estimation with joint angle calculation may include, for example, a computer vision pipeline. The pipeline may, for example, transform unstructured video into structured biomechanical measurements. In some embodiments, the biomechanical pattern matching algorithm may include, for example, a classification approach. The approach may achieve, for example, measurably higher accuracy than conventional methods. The approach may operate, for example, independently of user input. In some embodiments, the video verification mechanisms may include, for example, technical processes for detecting frame manipulation, temporal discontinuities, and cryptographic integrity violations. These technical features may relate to computer vision functionality and video analysis capabilities rather than abstract ideas or conventional human observation processes.

In some embodiments, the cross-exercise composite scoring system may include, for example, technical features related to distributed database technology and large-scale data processing. In some embodiments, the geographically partitioned database architecture with materialized views may include, for example, a data organization strategy. The strategy may reduce, for example, query latency by an order of magnitude or more (e.g., two or more). In some embodiments, the incremental update algorithms may include, for example, a technical solution to the ranking maintenance problem. The solution may reduce, for example, computational complexity from O(n log n) to O(log n). In some embodiments, the percentile-based normalization algorithm may include, for example, a distribution-agnostic comparison method. The method may address, for example, technical problems related to comparing heterogeneous performance metrics. In some embodiments, the event-driven recalculation pipeline may include, for example, a distributed systems architecture. The architecture may allow, for example, high-throughput data ingestion. For example, the architecture may facilitate ranking consistency. These technical features may relate to database system performance and distributed computing capabilities.

In some embodiments, the biomechanical pattern matching classification system may address, for example, technical problems in exercise classification systems that rely on user-provided labels. Conventional systems may accept, for example, user-supplied exercise names. The systems may use these labels to categorize performances. This approach may create, for example, multiple technical problems. Users may apply, for example, inconsistent terminology for identical movements. This may create, for example, fragmented datasets where the same exercise appears under multiple labels. Language barriers may prevent, for example, global aggregation of performance data. Exercise names may vary across languages. Translation-based approaches may introduce errors. Users may often lack knowledge of correct exercise terminology, particularly for modified variations. This may lead to misclassification that corrupts benchmark datasets. Users may, for example, intentionally mislabel easier exercises as harder variations to inflate performance scores. This may compromise the integrity of competitive leaderboards.

In some embodiments, the disclosed system may include, for example, automatic exercise classification based on measured biomechanical characteristics. The classification may operate, for example, independently of user-provided labels. In some embodiments, the classification process may begin with pose estimation. The estimation may extract, for example, 33 anatomical landmark positions from video frames. The extraction may generate, for example, temporal sequences of three-dimensional body coordinates. In some embodiments, the system may process these landmark sequences through a biomechanical signature generation algorithm. The algorithm may compute, for example, comprehensive movement characterizations. The characterizations may include, for example, joint angle ranges, movement velocities, and relative positioning patterns.

In some embodiments, biomechanical signature generation algorithm may include, for example, a multi-stage computational process. The first stage may compute, for example, joint angles for major joints at each video frame. The computation may construct, for example, vectors between connected landmarks. The computation may calculate, for example, angles using dot product operations. The second stage may determine, for example, range of motion (ROM) for each joint. The determination may identify, for example, the maximum and minimum angles observed across the temporal sequence. The third stage may compute, for example, movement velocities. The computation may analyze, for example, landmark displacement between consecutive frames. The computation may generate, for example, velocity vectors that characterize movement speed and direction. The fourth stage may analyze, for example, relative positioning patterns. The analysis may compute, for example, spatial relationships between body segments. Examples may include torso orientation relative to vertical or limb positions relative to the body center. These computed features may be aggregated, for example, into a biomechanical signature vector. The vector may typically include, for example, over 100 (e.g., 150-200 or more) numerical dimensions. The dimensions may characterize the movement pattern.

In some embodiments, the biomechanical pattern matching approach may include, for example, several technical advantages over conventional classification methods. The system may achieve, for example, increased classification accuracy compared to rule-based heuristic systems. The approach may correctly identify, for example, modified exercise variations with increased accuracy compared to relying on user-provided labels. The false positive rate for mislabeling detection may be reduced, for example, compared to conventional systems. The processing time per video may be, for example, reduced compared to conventional approaches. In some embodiments, the system may distinguish, for example, over 250 biomechanically distinct exercise types.

In some embodiments, language-independent classification capability may provided, for example, a technical advantage for global fitness platforms. The classification may operate, for example, on numerical biomechanical features extracted from video. The classification may process independently of user-provided text labels during the classification process. This technical approach may reduce, for example, translation layers and/or language-specific models. For example, this may allow a single global classification model to work identically for users speaking any language. In some embodiments, the system may reduce, for example, exercise category fragmentation. The reduction may consolidate, for example, user-generated labels (e.g., hundreds) into a smaller set of biomechanically distinct categories.

In some embodiments, automatic reclassification mechanism may detect, for example, discrepancies between user-provided labels and biomechanical evidence. For example, the detection may allow identification of mislabeled submissions. When the system determines that the biomechanical signature matches a different exercise type than the user-provided label, it may generate, for example, a classification report. The report may document, for example, the discrepancy and the confidence level of the biomechanical classification. This technical capability may reduce, for example, fraudulent labeling in competitive contexts. For example, this may increase dataset quality for machine learning applications, such as by identifying and correcting labeling errors.

In some embodiments, continuous similarity scoring approach may provide, for example, graceful handling of exercise variations and/or edge cases. Modified exercises may produce, for example, high similarity scores to the standard exercise type. The exercises may fall outside the strict criteria for standard classification. For example, this may be handled by automatic identification as modified variations. In some embodiments, the continuous scoring may allow, for example, confidence-based filtering. Submissions with similarity scores below a threshold (for example, 0.7) may be flagged for human review rather than being automatically classified or rejected. This technical approach may reduce, for example, classification errors. For example, this may facilitate high throughput for unambiguous cases and/or unsupervised automated classification.

In some embodiments, the biomechanical pattern matching classification system may include, for example, technical features related to computer vision and/or pattern recognition technology. In some embodiments, the biomechanical signature generation algorithm may include, for example, a computational process. The process may transform, for example, temporal landmark sequences into comprehensive movement characterizations. In some embodiments, the similarity scoring algorithm may include, for example, a classification approach. The approach may operate, for example, independently of user input. The approach may achieve, for example, measurably higher accuracy than conventional methods. In some embodiments, the language-independent classification capability may address, for example, technical problems in global software platforms. For example, the capability may reduce translation. In some embodiments, the continuous scoring with confidence estimation may include, for example, a pattern recognition technique. For example, the technique may allow graceful handling of ambiguous cases. These technical features may relate to computer vision functionality and pattern recognition capabilities rather than abstract ideas or conventional human observation processes.

In an illustrative aspect, a computer program product may include instructions stored on a computer-readable medium that, when executed by a processor, may cause the processor to perform tamper-proof performance evaluation operations for a sequence of physical exercises captured in video data. For example, the instructions may cause the processor to receive video data that contains a continuous recording of a user performing a sequence of physical exercises and to validate the video data using a tamper-proof process. For example, the instructions may cause the processor to generate an elapsed time value as a function of a start timestamp and an end timestamp extracted from the video data. For example, the instructions may cause the processor to analyze frame continuity of the video data by detecting abnormality, for example by detecting a frame-sequence break in the video data. For example, the instructions may cause the processor, when an absence of abnormality is confirmed, to verify that the sequence of physical exercises was performed as a continuous stream in a single uninterrupted session. For example, the instructions may cause the processor to generate a validated continuous-stream confirmation based on whether the continuous recording satisfies predefined specifications for a predetermined benchmark routine, and the predetermined benchmark routine may include at least one exercise to be performed in the single uninterrupted session. For example, the instructions may cause the processor, after receiving the validated continuous-stream confirmation, to apply the video data to a pose-detection model to identify body landmarks at each sample video frame, and each body landmark may have three-dimensional position coordinates corresponding to that body landmark at the corresponding sample video frame. For example, the instructions may cause the processor to generate joint angles between connected body landmarks and movement trajectories of the body landmarks based on changes in the three-dimensional position coordinates of the body landmarks over time across the video data. For example, the instructions may cause the processor to determine biomechanical characteristics exhibited by the user in the video data based on the joint angles and the movement trajectories, and the biomechanical characteristics may include at least range-of-motion values, movement-velocity measurements, and relative spatial positioning between the body landmarks. For example, the instructions may cause the processor, for each sample video frame, to determine a matching exercise type by selecting, from among predefined biomechanical criteria, a set of criteria that most closely match the biomechanical characteristics exhibited by the user. For example, each set of the predefined biomechanical criteria may include specific biomechanical characteristics of a distinct exercise type in the predetermined benchmark routine, and the matching exercise type may be selected independently of any exercise designation provided by the user. For example, the instructions may cause the processor to automatically detect completion of a final mandatory exercise in the predetermined benchmark routine by identifying when the biomechanical characteristics match completion criteria of the final mandatory exercise. For example, the instructions may cause the processor, in response to detecting completion, to generate a performance record that includes the elapsed time value, the validated continuous-stream confirmation, and an exercise-type identifier determined based on the biomechanical characteristics.

In some examples, the instructions may cause the processor to identify, within the video data, an uninterrupted sequence of video frames that record performance of a modified variation of a standard exercise based on the biomechanical characteristics. For example, the instructions may cause the processor to automatically classify that performance into a modified-exercise category that is different from a standard-exercise category for the same exercise type, and the instructions may cause the processor to record in the performance record whether the exercise-type identifier indicates the standard category or the modified category for that exercise type.

In some examples, the instructions may cause the processor, when classifying a modified-exercise category, to determine a reason for the modified variation based on the biomechanical characteristics. For example, the reason may indicate whether the modified variation is voluntary, fatigue-induced, or medically constrained, and the instructions may cause the processor to store that reason in the performance record.

In some examples, the instructions may cause the processor, when detecting abnormality in the video data, to detect timestamp discontinuities and to detect visual artifacts that indicate video editing.

In some examples, the instructions may cause the processor, when generating the elapsed time value, to authenticate the start timestamp and the end timestamp through a cryptographic consistency check applied to metadata generated by a recording device that captured the video data. For example, the instructions may cause the processor, when detecting abnormality, to identify a cryptographic inconsistency between successive metadata elements, and that inconsistency may indicate that one or more portions of the video data have been tampered with.

In some examples, the predetermined benchmark routine may include multiple exercises drawn from different functional fitness categories.

In some examples, the body landmarks used for analysis may include at least thirty-three distinct anatomical points, for example including the head, shoulders, elbows, wrists, hips, knees, and ankles.

In some examples, each set of the predefined biomechanical criteria may include specification of prescribed ranges for joint angles, ranges of motion, movement velocities, and relative positioning associated with the distinct exercise type.

In some examples, the performance record may be stored in a distributed database so that it can be used later for performance comparisons.

In a first illustrative aspect related to storing benchmark data, a computer program product may include instructions that, when executed by a processor, may cause the processor to store the performance record in a global fitness benchmark database. For example, the instructions may cause the processor to generate, based on a predetermined set of lineage rules, a public attribute profile that includes demographic metadata, geographic context, and data-quality indicators associated with the matching exercise type. For example, the instructions may cause the processor to generate, based on a predetermined set of access-authorization rules and on user-provided consent, a private attribute profile that includes ownership lineage, consent terms, and provenance indicators associated with the matching exercise type. For example, the instructions may cause the processor to create a first immutable data structure that contains the public attribute profile and a second immutable data structure that contains the private attribute profile and a set of predetermined access permissions. For example, the instructions may cause the processor to digitally link the first immutable data structure and the second immutable data structure to the performance record using a unique identifier. For example, the instructions may cause the processor, when an access device accesses the unique identifier during a transaction, to make the first immutable data structure accessible while keeping the second immutable data structure restricted unless the predetermined access permissions associated with the private attribute profile are satisfied.

In some examples, the instructions may cause the processor to generate a third immutable data structure based on compliance conditions. For example, the instructions may cause the processor to identify compliance-sensitive data in the first immutable data structure to be modified based on an adaptive-compliance learning process. For example, the instructions may cause the processor to generate the third immutable data structure that contains an updated public attribute profile. For example, the instructions may cause the processor to digitally delink the first immutable data structure and to digitally link the third immutable data structure to the second immutable data structure using the unique identifier.

In some examples, the instructions may cause the processor to receive, from a digital data marketplace, a request for data from the global fitness benchmark database. For example, the instructions may cause the processor to generate a marketplace data object that contains an anonymized training dataset, and the anonymized training dataset may be generated based on the unique identifier linked to the third immutable data structure so that only privacy-compliant data is transmitted to the digital data marketplace.

In some examples, the instructions may cause the processor to use an artificial-intelligence model to generate new metadata fields. For example, the instructions may cause the processor to estimate an expected improvement in model-training performance from acquiring each of the new metadata fields. For example, the instructions may cause the processor to assign a value score to each of the new metadata fields based on the expected improvement. For example, the instructions may cause the processor to automatically generate a request to the user for a metadata field that is associated with a highest value score.

In a second illustrative aspect, a computer program product may include instructions stored on a computer-readable medium that, when executed by a processor, may cause the processor to perform cross-exercise scoring operations to generate comparative fitness scores based on exercise performance records. For example, the instructions may cause the processor to receive a user-specified comparison scope selected from among a local scope, a regional scope, and a global geographic scope. For example, the instructions may cause the processor to dynamically construct a reference dataset by querying a distributed database to retrieve exercise performance records that match the user-specified comparison scope, and the distributed database may store exercise performance records for many users across multiple geographic locations. For example, constructing the reference dataset may include applying a geographic filter based on the user-specified comparison scope to select exercise performance records within a defined geographic boundary. For example, the instructions may cause the processor to receive a first exercise performance record associated with a first user, where that record indicates that the first user performed a first exercise type at a first geographic location, and each exercise performance record may include an exercise-type identifier, a performance metric value, a user identifier, geographic coordinates, and a timestamp. For example, the instructions may cause the processor to calculate, for the first exercise type, a first ranking by determining the performance metric value of the first user relative to other performance metric values recorded for the same exercise type within the reference dataset. For example, the instructions may cause the processor to generate a first normalized score based on the first ranking within the reference dataset by applying a percentile-based normalization function to the first ranking. For example, the instructions may cause the processor to assign the first exercise type to a first functional fitness category chosen from predefined functional fitness categories, and each functional fitness category may represent a distinct aspect of physical capability, for example upper-body strength, core strength, lower-body strength, and flexibility. For example, the instructions may cause the processor to update the distributed database with the first normalized score associated with the first user and the first functional fitness category. For example, the instructions may cause the processor, for each functional fitness category, to identify a highest normalized score achieved by the first user within that functional fitness category. For example, the instructions may cause the processor to generate a first composite fitness score for the first user by summing the highest normalized scores achieved by the first user across the predefined functional fitness categories. For example, the instructions may cause the processor to compare the first composite fitness score of the first user with a second composite fitness score of a second user at a second geographic location to generate a cross-user comparison result, and the second composite fitness score may be generated by summing the highest normalized scores achieved by the second user across the predefined functional fitness categories. For example, none of the highest normalized scores achieved by the second user may be generated by performing the first exercise type, and the cross-user comparison result may therefore compare users who performed not completely identical exercises at different geographic locations. For example, the instructions may cause the processor to automatically regenerate rankings and normalized scores when a new exercise performance record is stored in the distributed database by re-querying the database and re-applying the percentile-based normalization function, and this automatic regeneration may maintain current comparative accuracy as the reference dataset grows.

In some examples, the percentile-based normalization function may convert the first ranking into the first normalized score within a predetermined upper bound and a predetermined lower bound based on the first user's relative position within the reference dataset.

In some examples, the predefined functional fitness categories may also include cardiovascular endurance, speed, and balance.

In some examples, the instructions may cause the processor to filter out the first exercise performance record when data-quality indicators fail predefined quality thresholds, and the data-quality indicators may include video resolution, continuity of video frames, and authenticity of timestamp metadata.

In some examples, automatically regenerating rankings and normalized scores may include recomputing percentile breakpoints within each of the predefined functional fitness categories based on newly added performance records. For example, the recomputation may allow the percentile-based normalization function to adapt to changes in population distribution over time.

For example, the operations may include generate a dataset-quality score for each exercise performance record. For example, generating the dataset-quality score comprises: evaluating the record against a plurality of predetermined quality dimensions comprising capture-quality indicators, biomechanical completeness indicators, geographic-context completeness indicators, and/or consent-provenance completeness indicators. For example, the operations may include compute a weighted aggregate dataset-quality score that may be stored together with the exercise performance record. For example, the operations may include apply the dataset-quality score as a filter predicate during construction of the reference dataset such that only records meeting a minimum dataset-quality threshold may be included.

In a third illustrative aspect, a computer program product may include instructions stored on a computer-readable medium that, when executed by a processor, may cause the processor to perform tamper-proof performance evaluation operations to evaluate performance of a physical exercise captured in video data. For example, the instructions may cause the processor, in response to receiving video data that includes a continuous recording of a user performing an exercise, to apply the video data to a pose-detection model to identify body landmarks at each sample video frame, and each body landmark may have three-dimensional position coordinates corresponding to that body landmark at the corresponding sample video frame. For example, the instructions may cause the processor to generate joint angles between connected body landmarks and movement trajectories of the body landmarks based on changes in the three-dimensional position coordinates of the body landmarks over time across the video data. For example, the instructions may cause the processor to determine biomechanical characteristics exhibited by the user in the video data based on the joint angles and the movement trajectories, and the biomechanical characteristics may include at least range-of-motion values, movement-velocity measurements, and relative spatial positioning between the body landmarks. For example, the instructions may cause the processor to access a classification database that stores exercise-classification entries, each associated with an exercise type, and each exercise-classification entry may include an exercise-type identifier, predefined biomechanical criteria that include prescribed ranges for joint angles, ranges of motion, movement velocities, and relative positioning for that exercise type, and modification indicators that identify common variations of the exercise type. For example, the instructions may cause the processor to generate similarity scores, each similarity score being a numerical measurement of alignment between the biomechanical characteristics and the predefined biomechanical criteria for a corresponding exercise-classification entry. For example, the instructions may cause the processor to identify a close-matching exercise-classification entry based on the similarity scores. For example, the instructions may cause the processor, when the biomechanical characteristics fall within the predefined biomechanical criteria for a corresponding exercise type, to classify the exercise as a standard exercise type. For example, the instructions may cause the processor, when the biomechanical characteristics fall outside the predefined biomechanical criteria for the corresponding exercise type but fall within predefined biomechanical criteria for a modified variation identified by the modification indicators, to automatically classify the exercise as the modified variation instead of the standard exercise type. For example, the instructions may cause the processor, when the user provides an exercise designation that differs from the close-matching exercise-classification entry, to automatically reclassify the performed exercise from the user-provided designation to the close-matching exercise-classification entry based only on comparison between the biomechanical characteristics and the predefined biomechanical criteria. For example, the instructions may cause the processor to generate a classification report indicating the close-matching exercise type.

In some examples, the instructions may cause the processor to generate, in the classification report, a visual indicator that represents differences between the user-provided exercise designation and the close-matching exercise type, along with specific biomechanical characteristics that triggered the reclassification.

For example, the operations of the first, the second and/or the third illustrative aspects may include automatically generate a structured naming identifier for each performance record. For example, the structured naming identifier may be generated by encoding within the identifier a plurality of metadata fields comprising geographic region, facility identifier, exercise type identifier, data-quality tier, consent tier, and/or version information. For example, the structured naming identifier may be machine-readable such that at least one of geographic scope, facility type, exercise category, data-quality level, and/or versioning information may be determined directly from the identifier without retrieving the underlying record.

For example, the operations may include parse the structured naming identifier to determine at least one metadata attribute comprising geographic region, exercise category, facility type, data-quality tier, consent tier, or version, and/or to perform dataset filtering, dataset selection, and/or ranking operations based solely on the parsed attributes without retrieving the underlying video data, biomechanical data, or stored metadata.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A method for transforming heterogeneous real-world data into standardized data assets for ingestion by AI models, the method comprising operations performed by one or more processors, the operations comprising:

receiving a plurality of data records from a plurality of heterogeneous data sources, wherein the plurality of data records comprises at least two different record types and wherein the plurality of heterogeneous data sources are distributed across a plurality of geographic regions;

automatically generating, for each data record of the plurality of data records, a public attribute profile by applying a set of lineage rules to the data record, wherein the public attribute profile comprises at least demographic metadata, geographic context, and data-quality indicators derived from the data record;

automatically generating, for each data record of the plurality of data records, a private attribute profile by applying a set of access-authorization rules to the data record based on user-provided consent associated with the data record, wherein the private attribute profile comprises at least ownership lineage, consent terms, and provenance indicators;

creating, for each data record, a first data structure comprising the public attribute profile and a second data structure comprising the private attribute profile and a set of predetermined access permissions, wherein each of the first data structure and the second data structure comprises integrity-preserving mechanisms including append-only storage constraints, version-identification fields, and integrity indicators;

assigning a unique identifier to each data record and digitally linking the first data structure and the second data structure to the data record using the unique identifier, such that the data record, the public attribute profile, and the private attribute profile are jointly addressable as a standardized data asset;

generating, for each standardized data asset, a dataset-quality score by evaluating the data record against a plurality of predetermined quality dimensions and computing a weighted aggregate thereof, wherein the plurality of predetermined quality dimensions comprises at least capture-quality indicators, geographic-context completeness indicators, and consent-provenance completeness indicators;

storing each standardized data asset together with its dataset-quality score in a distributed database;

performing automated data completeness verification on each standardized data asset stored in the distributed database, the automated data completeness verification comprising programmatically determining which mandatory metadata fields are missing for the standardized data asset, and computing an AI training value for each missing metadata field based on an estimated improvement in model-training performance from acquiring the missing metadata field; and generating a privacy-preserving training view in response to a request received via an artificial-intelligence access interface from an external artificial-intelligence system, the privacy-preserving training view derived from one or more of the standardized data assets by applying policy-evaluation logic that compares information in the received request against stored output generation rules comprising consent rules and data-usage restrictions, wherein:

the privacy-preserving training view includes from the first data structure only data that satisfies the stored output generation rules, the second data structure is retained in the distributed database, and an auditable compliance chain associated with the unique identifier is preserved.

2. The method of claim 1, wherein:

the plurality of heterogeneous data sources comprises one or more of video capture devices, wearable sensors, mobile device cameras, external databases, and/or third-party data feeds, and each data record retains a source-type indicator identifying which source type generated the data record.

3. The method of claim 1, wherein the set of lineage rules comprises rules that evaluate at least a data contributor identifier, a data collection timestamp, a geographic origin indicator, and a chain-of-custody log associated with each data record to derive the public attribute profile.

4. The method of claim 1, wherein:

the set of access-authorization rules comprises rules that evaluate user-provided consent terms, applicable jurisdictional privacy requirements, and a data sensitivity classification associated with each data record to derive the private attribute profile, and the set of predetermined access permissions restricts access to the second data structure based on at least one of a requester identity, a permitted use category, and/or a consent scope.

5. The method of claim 1, wherein transforming the plurality of data records into the standardized data assets comprises:

executing a data processing pipeline comprising ingesting raw data from the plurality of heterogeneous data sources, filtering the ingested data against quality thresholds and compliance verification criteria, tagging each data record with classification labels and contextual metadata, assigning the unique identifier to each data record that satisfies the quality thresholds, processing tagged data records to extract derived metrics, computing a score for each processed data record, and/or generating a marketplace listing for each scored data record.

6. The method of claim 1, wherein generating the dataset-quality score comprises applying a multi-factor weighting algorithm to at least:

a media presence indicator representing whether the data record includes a media recording; a user consent indicator representing whether affirmative consent for AI model training use has been provided;

a metadata completeness percentage representing a proportion of required metadata fields populated;

a technical quality composite derived from at least two of resolution, frame rate, signal clarity, and/or capture stability metrics; and a regional scarcity factor computed based on a degree of underrepresentation of a geographic region of origin relative to a global distribution of data records in the distributed database.

7. The method of claim 6, wherein the regional scarcity factor is generated by operations compromising:

determining a geographic region of origin for each data record based on location metadata, computing a regional representation ratio by dividing a count of data records originating from the geographic region by a total count of data records in the distributed database, and assigning an elevated scarcity weighting factor to data records originating from geographic regions having a regional representation ratio below a predetermined underrepresentation threshold.

8. The method of claim 1, wherein:

generating the privacy-preserving training view comprises applying anonymization operations to each standardized data asset from which the privacy-preserving training view is derived, and the anonymization operations remove or obscure personally identifying information while preserving demographic metadata, geographic context, data-quality indicators, and the unique identifier, such that the privacy-preserving training view retains AI training utility while satisfying the consent terms stored in the second data structure.

9. The method of claim 1, wherein the distributed database stores a first layer comprising composite multi-domain records each representing aggregated data across a plurality of record types from a common participant, and a second layer comprising isolated single-domain records each representing data for an individual record type, wherein records in the first layer and records in the second layer are bidirectionally linked via a common participant identifier and shared demographic metadata.

10. The method of claim 9, further comprising training a machine learning model to infer a composite first-layer score from one or more isolated second-layer records, wherein the machine learning model is trained on paired records comprising both isolated single-domain data and corresponding composite scores from same participants, such that a composite score can be predicted for a participant having only isolated single-domain records.

11. The method of claim 1, wherein:

the plurality of heterogeneous data sources comprises mobile device cameras capturing video recordings of physical exercise performances, the at least two different record types comprise video-based exercise performance records and demographic metadata records, and each standardized data asset comprises an exercise type classification, a performance score, and demographic metadata of a performing user.

12. The method of claim 11, further comprising:

extracting three-dimensional coordinates of a plurality of body landmarks from each video recording using a pose estimation model, and classifying an exercise type by comparing detected joint angles and relative skeletal positions derived from the body landmarks against a database of predefined biomechanical criteria thresholds, wherein the classification is performed based on detected movement patterns without reference to language-specific input.

13. The method of claim 12, wherein when detected movement patterns satisfy a subset but not all of the biomechanical criteria thresholds for a primary exercise type, the method further comprises automatically assigning a variant exercise classification such that modified or variant exercise forms are classified as recognized variants of the primary exercise type rather than rejected.

14. The method of claim 11, further comprising validating a continuous multi-exercise benchmark routine by operations comprising:

receiving a timer signal from a recording device at initiation of a first exercise within a multi-exercise routine;

tracking a continuous sequence of at least two distinct exercise types performed within a single uninterrupted recording session;

counting and verifying repetitions for each exercise type against predefined criteria; automatically terminating the timer upon detection of completion of a final required exercise; and generating a single integrated routine time, wherein temporal continuity of the recording session is verified to confirm that exercise segments were not separately recorded and subsequently combined.

15. The method of claim 14, further comprising generating sub-times corresponding to intermediate completion milestones within the continuous multi-exercise benchmark routine, comprising at least a sub-time for completion of each distinct exercise type and a sub-time for each of a plurality of distance thresholds within a cardiovascular exercise component of the routine.

16. The method of claim 11, further comprising generating a normalized performance score for each exercise performance record by operations comprising generating a rank ratio by dividing a rank of a user among all participants in a selected comparison group by a total number of participants in the comparison group, determining a complement value as one minus the rank ratio, determining a scaled score based on the complement value, and applying special-case handling when the user holds a first-place rank within the comparison group.

17. The method of claim 1, further comprising:

determining a geographic jurisdiction associated with each data contributor based on location metadata;

retrieving applicable jurisdictional privacy regulation requirements and institutional review requirements from a compliance rules database;

dynamically adjusting a data collection interface to present required jurisdiction-specific input fields; and generating a compliance label for each data record comprising a binary consent indicator representing affirmative consent for AI model training use and a regional compliance flag indicating satisfaction of jurisdiction-specific regulatory requirements.

18. The method of claim 1, wherein the first data structure and the second data structure are each immutable data structures.

19. The method of claim 18, wherein each immutable data structure comprises:

an append-only data structure that creates a new entry when a record is updated and retains earlier entries without overwriting the earlier entries;

a version-identification field that assigns a monotonically increasing version value to each new entry related to a given record lineage; and a cryptographic hash value generated based on contents of the record and stored with the record as an integrity indicator.

20. A system for transforming heterogeneous real-world data into standardized data assets for ingestion by AI models, the system comprising:

one or more processors; and a non-transitory computer-readable medium storing instructions that, when executed by the one or more processors, cause the system to perform operations comprising:

receiving a plurality of data records from a plurality of heterogeneous data sources, wherein the plurality of data records comprises at least two different record types and wherein the plurality of heterogeneous data sources are distributed across a plurality of geographic regions;

automatically generating, for each data record of the plurality of data records, a public attribute profile by applying a set of lineage rules to the data record, wherein the public attribute profile comprises at least demographic metadata, geographic context, and data-quality indicators derived from the data record;

automatically generating, for each data record of the plurality of data records, a private attribute profile by applying a set of access-authorization rules to the data record based on user-provided consent associated with the data record, wherein the private attribute profile comprises at least ownership lineage, consent terms, and provenance indicators;

creating, for each data record, a first data structure comprising the public attribute profile and a second data structure comprising the private attribute profile and a set of predetermined access permissions, wherein each of the first data structure and the second data structure comprises integrity-preserving mechanisms including append-only storage constraints, version-identification fields, and integrity indicators;

assigning a unique identifier to each data record and digitally linking the first data structure and the second data structure to the data record using the unique identifier, such that the data record, the public attribute profile, and the private attribute profile are jointly addressable as a standardized data asset;

generating, for each standardized data asset, a dataset-quality score by evaluating the data record against a plurality of predetermined quality dimensions and computing a weighted aggregate thereof, wherein the plurality of predetermined quality dimensions comprises at least capture-quality indicators, geographic-context completeness indicators, and consent-provenance completeness indicators;

storing each standardized data asset together with its dataset-quality score in a distributed database;

performing automated data completeness verification on each standardized data asset stored in the distributed database, the automated data completeness verification comprising programmatically determining which mandatory metadata fields are missing for the standardized data asset, and computing an AI training value for each missing metadata field based on an estimated improvement in model-training performance from acquiring the missing metadata field; and generating a privacy-preserving training view in response to a request received via an artificial-intelligence access interface from an external artificial-intelligence system, the privacy-preserving training view derived from one or more of the standardized data assets by applying policy-evaluation logic that compares information in the received request against stored output generation rules comprising consent rules and data-usage restrictions, wherein:

the privacy-preserving training view includes from the first data structure only data that satisfies the stored output generation rules, the second data structure is retained in the distributed database, and an auditable compliance chain associated with the unique identifier is preserved.

21. The system of claim 20, further comprising a plurality of user devices distributed across the plurality of geographic regions, each user device comprising at least one of a camera or a sensor and being configured to capture a data record and transmit the data record to the one or more processors together with device-generated metadata comprising a device type identifier, one or more capture specification values including at least a resolution value and a frame rate value, geographic coordinates, and a capture timestamp, wherein the one or more processors compute the capture-quality indicators within the dataset-quality score by evaluating the capture specification values received from each transmitting user device.

22. The system of claim 20, wherein the plurality of heterogeneous data sources comprises user devices operating across at least two different device platforms, and wherein the one or more processors apply a source-type normalization operation to each received data record that maps device-platform-specific data formats to a common internal data schema, such that standardized data assets stored in the distributed database are comparable across data records originating from different device platforms.

23. A computer program product comprising a program of instructions tangibly embodied on at least one non-transitory computer-readable medium, wherein when the instructions are executed on at least one processor, the at least one processor causes operations to be performed, the operations comprising:

receiving a plurality of data records from a plurality of heterogeneous data sources, wherein the plurality of data records comprises at least two different record types and wherein the plurality of heterogeneous data sources are distributed across a plurality of geographic regions;

automatically generating, for each data record of the plurality of data records, a public attribute profile by applying a set of lineage rules to the data record, wherein the public attribute profile comprises at least demographic metadata, geographic context, and data-quality indicators derived from the data record;

automatically generating, for each data record of the plurality of data records, a private attribute profile by applying a set of access-authorization rules to the data record based on user-provided consent associated with the data record, wherein the private attribute profile comprises at least ownership lineage, consent terms, and provenance indicators;

creating, for each data record, a first data structure comprising the public attribute profile and a second data structure comprising the private attribute profile and a set of predetermined access permissions, wherein each of the first data structure and the second data structure comprises integrity-preserving mechanisms including append-only storage constraints, version-identification fields, and integrity indicators;

assigning a unique identifier to each data record and digitally linking the first data structure and the second data structure to the data record using the unique identifier, such that the data record, the public attribute profile, and the private attribute profile are jointly addressable as a standardized data asset;

generating, for each standardized data asset, a dataset-quality score by evaluating the data record against a plurality of predetermined quality dimensions and computing a weighted aggregate thereof, wherein the plurality of predetermined quality dimensions comprises at least capture-quality indicators, geographic-context completeness indicators, and consent-provenance completeness indicators;

storing each standardized data asset together with its dataset-quality score in a distributed database;

performing automated data completeness verification on each standardized data asset stored in the distributed database, the automated data completeness verification comprising programmatically determining which mandatory metadata fields are missing for the standardized data asset, and computing an AI training value for each missing metadata field based on an estimated improvement in model-training performance from acquiring the missing metadata field; and generating a privacy-preserving training view in response to a request received via an artificial-intelligence access interface from an external artificial-intelligence system, the privacy-preserving training view derived from one or more of the standardized data assets by applying policy-evaluation logic that compares information in the received request against stored output generation rules comprising consent rules and data-usage restrictions, wherein:

the privacy-preserving training view includes from the first data structure only data that satisfies the stored output generation rules, the second data structure is retained in the distributed database, and an auditable compliance chain associated with the unique identifier is preserved.

24. The computer program product of claim 23, wherein transforming the plurality of data records into the standardized data assets comprises executing a data processing pipeline comprising:

ingesting raw data from the plurality of heterogeneous data sources;

filtering the ingested data against quality thresholds and compliance verification criteria;

tagging each data record with classification labels and contextual metadata;

assigning the unique identifier to each data record that satisfies the quality thresholds;

processing tagged data records to extract derived metrics;

computing the dataset-quality score for each processed data record by applying a multi-factor weighting algorithm to at least a media presence indicator representing whether the data record includes a media recording, a user consent indicator representing whether affirmative consent for AI model training use has been provided, a metadata completeness percentage representing a proportion of required metadata fields populated, a technical quality composite derived from at least two of resolution, frame rate, signal clarity, and capture stability metrics, and a regional scarcity factor computed based on a degree of underrepresentation of a geographic region of origin relative to a global distribution of data records in the distributed database; and generating a marketplace listing for each scored data record.

25. The computer program product of claim 23, wherein:

the distributed database stores a first layer comprising composite multi-domain records each representing aggregated data across a plurality of record types from a common participant and a second layer comprising isolated single-domain records each representing data for an individual record type, records in the first layer and records in the second layer are bidirectionally linked via a common participant identifier and shared demographic metadata, the operations further comprise training a machine learning model to infer a composite first-layer score from one or more isolated second-layer records, and the machine learning model is trained on paired records comprising both isolated single-domain data and corresponding composite scores from same participants, such that a composite score can be predicted for a participant having only isolated single-domain records.

* * * * *